(12) United States Patent
Nowak et al.

(10) Patent No.: US 9,318,864 B2
(45) Date of Patent: Apr. 19, 2016

(54) LASER BEAM OUTPUT CONTROL WITH OPTICAL SHUTTER

(75) Inventors: Krzysztof Nowak, Oyama (JP); Osamu Wakabayashi, Hiratsuka (JP); Hideo Hoshino, Hiratsuka (JP)

(73) Assignee: GIGAPHOTON INC., Tochigi (JP)

( * ) Notice: Subject to any disclaimer, the term of this patent is extended or adjusted under 35 U.S.C. 154(b) by 275 days.

(21) Appl. No.: 13/642,408

(22) PCT Filed: Dec. 15, 2011

(86) PCT No.: PCT/IB2011/003068
§ 371 (c)(1),
(2), (4) Date: Oct. 19, 2012

(87) PCT Pub. No.: WO2012/085638
PCT Pub. Date: Jun. 28, 2012

(65) Prior Publication Data
US 2013/0032735 A1 Feb. 7, 2013

(30) Foreign Application Priority Data

Dec. 20, 2010 (JP) .................................. 2010-283715
Mar. 24, 2011 (JP) .................................. 2011-066786
Sep. 1, 2011 (JP) .................................. 2011-190364
Nov. 16, 2011 (JP) .................................. 2011-250333

(51) Int. Cl.
*H01S 3/10* (2006.01)
*H01S 3/00* (2006.01)
(Continued)

(52) U.S. Cl.
CPC ............. *H01S 3/0085* (2013.01); *H01S 3/2316* (2013.01); *H05G 2/008* (2013.01); *H01S 3/0064* (2013.01); *H01S 3/235* (2013.01); *H01S 3/2366* (2013.01); *H01S 3/2375* (2013.01); *H01S 2301/02* (2013.01)

(58) Field of Classification Search
CPC . H01S 3/0057; H01S 2301/02; H01S 3/0401; H01S 3/0405; H01S 3/0407; H01S 3/06758; H01S 3/10046; H01S 3/107; H01S 3/235
See application file for complete search history.

(56) References Cited

U.S. PATENT DOCUMENTS

| | | | |
|---|---|---|---|
| 4,872,181 A * | 10/1989 | Johnson et al. | ............... 372/106 |
| 5,162,919 A * | 11/1992 | Ono | ............... H04N 1/02815 |
| | | | 347/237 |
| 5,400,350 A | 3/1995 | Galvanauskas | |

(Continued)

FOREIGN PATENT DOCUMENTS

| | | |
|---|---|---|
| JP | S63-227093 A | 9/1988 |
| JP | H05-005912 A | 1/1993 |

(Continued)

OTHER PUBLICATIONS

International Search Report issued in International Patent Application No. PCT/IB2011/003068 dated Jul. 25, 2012.
(Continued)

*Primary Examiner* — Brooke Purinton
(74) *Attorney, Agent, or Firm* — Studebaker & Brackett PC

(57) ABSTRACT

A laser apparatus may include: a master oscillator configured to output a pulsed laser beam at a repetition rate; at least one amplifier disposed on a beam path of the pulsed laser beam; at least one optical shutter disposed on the beam path of the pulsed laser beam; and a controller configured to switch the at least one optical shutter.

14 Claims, 29 Drawing Sheets

(51) Int. Cl.
*H01S 3/23* (2006.01)
*H05G 2/00* (2006.01)

(56) References Cited

U.S. PATENT DOCUMENTS

| | | | |
|---|---|---|---|
| 7,164,144 B2 | 1/2007 | Partlo et al. | |
| 7,323,703 B2 | 1/2008 | Oliver et al. | |
| 7,388,220 B2 | 6/2008 | Fomenkov et al. | |
| 7,411,203 B2 | 8/2008 | Fomenkov et al. | |
| 7,449,704 B2 | 11/2008 | Fomenkov et al. | |
| 7,608,846 B2 | 10/2009 | Nakano | |
| 7,876,803 B1 * | 1/2011 | Di Teodoro et al. | 372/94 |
| 7,928,416 B2 | 4/2011 | Fomenkov | |
| 8,000,361 B2 | 8/2011 | Abe et al. | |
| 8,704,200 B2 | 4/2014 | Bykanov et al. | |
| 8,842,703 B1 * | 9/2014 | Zhang | H01S 3/1063 372/25 |
| RE45,177 E * | 10/2014 | Galvanauskas et al. | 359/345 |
| 2003/0142198 A1 | 7/2003 | Miyake | |
| 2003/0193975 A1 | 10/2003 | Pang | |
| 2003/0218114 A1 * | 11/2003 | Suzuki | 250/201.3 |
| 2004/0179571 A1 * | 9/2004 | Govorkov et al. | 372/55 |
| 2004/0228376 A1 * | 11/2004 | Dane et al. | 372/32 |
| 2004/0263949 A1 | 12/2004 | Gu et al. | |
| 2005/0157381 A1 * | 7/2005 | Kafka et al. | 359/346 |
| 2005/0199829 A1 | 9/2005 | Partlo et al. | |
| 2006/0088067 A1 | 4/2006 | Vetrovec et al. | |
| 2006/0191884 A1 | 8/2006 | Johnson et al. | |
| 2007/0047601 A1 * | 3/2007 | Yu | 372/25 |
| 2007/0125970 A1 | 6/2007 | Fomenkov et al. | |
| 2007/0158596 A1 | 7/2007 | Oliver et al. | |
| 2007/0158597 A1 | 7/2007 | Fomenkov et al. | |
| 2007/0170377 A1 | 7/2007 | Nakano | |
| 2008/0017801 A1 | 1/2008 | Fomenkov et al. | |
| 2008/0018977 A1 * | 1/2008 | Bergmann et al. | 359/257 |
| 2008/0149862 A1 | 6/2008 | Hansson et al. | |
| 2008/0270549 A1 | 10/2008 | Chellapilla et al. | |
| 2009/0232171 A1 | 9/2009 | Abe et al. | |
| 2009/0245302 A1 * | 10/2009 | Baird et al. | 372/25 |
| 2009/0296758 A1 * | 12/2009 | Brown et al. | 372/25 |
| 2010/0220756 A1 * | 9/2010 | Krzysztof et al. | 372/38.02 |
| 2011/0019705 A1 * | 1/2011 | Adams et al. | 372/25 |
| 2011/0079736 A1 | 4/2011 | Hansson et al. | |
| 2011/0261844 A1 | 10/2011 | Abe et al. | |
| 2012/0193547 A1 | 8/2012 | Hansson et al. | |

FOREIGN PATENT DOCUMENTS

| | | |
|---|---|---|
| JP | 05-063262 A | 3/1993 |
| JP | H08-248454 A | 9/1996 |
| JP | H09-197356 A | 7/1997 |
| JP | 2007-200615 A | 8/2007 |
| JP | 2007-528607 A | 10/2007 |
| JP | 2008-528291 A | 7/2008 |
| JP | 2008-209797 A | 9/2008 |
| JP | 2008-270549 A | 11/2008 |
| JP | 2009-246345 A | 10/2009 |
| JP | 2010-514214 A | 4/2010 |

OTHER PUBLICATIONS

An Office Action; "Notice of Reason for Rejection," issued by the Japanese Patent Office on Jun. 16, 2015, which corresponds to Japanese Patent Application No. 2011-250333 and is related to U.S. Appl. No. 13/642,408; with English language translation.

An Office Action; "Notice of Reason for Rejection," issued by the Japanese Patent Office on Jan. 19, 2016, which corresponds to Japanese Patent Application No. 2011-250333 and is related to U.S. Appl. No. 13/642,408; with English language translation.

* cited by examiner

LASER BEAM OUTPUT CONTROL WITH OPTICAL SHUTTER

CROSS-REFERENCE TO RELATED APPLICATIONS

The present application is the U.S. National Phase under 35 U.S.C. §371 of International Application No. PCT/IB2011/003068, filed on Dec. 15, 2011, which in turn claims priority from Japanese Patent Application No. 2010-283715 filed Dec. 20, 2010, Japanese Patent Application No. 2011-066786 filed Mar. 24, 2011, Japanese Patent Application No. 2011-190364 filed Sep. 1, 2011, and Japanese Patent Application No. 2011-250333 filed Nov. 16, 2011, the disclosures of which Applications are incorporated by reference herein.

BACKGROUND

1. Technical Field

This disclosure relates to a laser apparatus and an extreme ultraviolet (EUV) light generation system including the laser apparatus.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication at 32 nm or less, for example, an exposure apparatus is expected to be developed, in which a system for generating extreme ultraviolet (EUV) light at a wavelength of approximately 13 nm is combined with a reduced projection reflective optical system.

Three kinds of systems for generating EUV light have been known in general, which include an LPP (Laser Produced Plasma) type system in which plasma generated by irradiating a target material with a laser beam is used, a DPP (Discharge Produced Plasma) type system in which plasma generated by electric discharge is used, and an SR (Synchrotron Radiation) type system in which orbital radiation is used.

SUMMARY

A laser apparatus according to one aspect of this disclosure may include: a master oscillator configured to output a pulsed laser beam at a repetition rate; at least one amplifier disposed on a beam path of the pulsed laser beam; at least one optical shutter disposed on the beam path of the pulsed laser beam; and a controller configured to switch the at least one optical shutter.

An extreme ultraviolet light generation system according to another aspect of this disclosure may include: a laser apparatus including a master oscillator configured to output a pulsed laser beam at a repetition rate, at least one amplifier disposed on a beam path of the pulsed laser beam, at least one optical shutter disposed on the beam path of the pulsed laser beam, and a controller configured to switch the at least one optical shutter; a chamber; a target supply unit for supplying a target material to a region inside the chamber; and a focusing optical element for focusing the pulsed laser beam from the laser apparatus in the region inside the chamber.

BRIEF DESCRIPTION OF THE DRAWINGS

Hereinafter, several embodiments of this disclosure will be described with reference to the accompanying drawings. It should be noted that a polarizer described in this application is an example of an optical filter.

DESCRIPTION OF PREFERRED EMBODIMENTS

Figure 1:
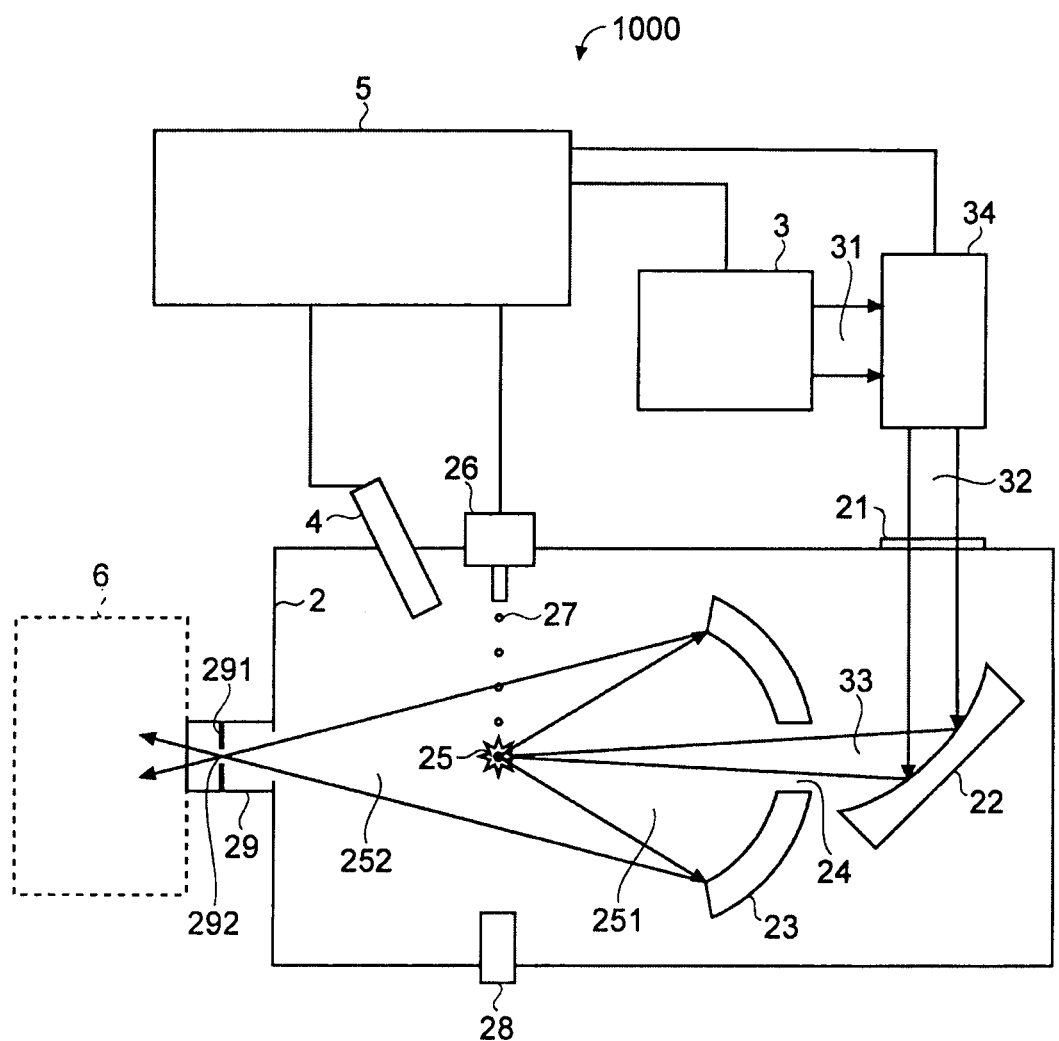
FIG. 1 schematically illustrates the configuration of an exemplary EUV light generation system.

Hereinafter, selected embodiments of this disclosure will be described in detail with reference to the accompanying drawings. The embodiments to be described below are merely illustrative in nature and do not limit the scope of this disclosure. Further, configurations and operations described in each embodiment are not all essential in implementing this disclosure. It should be noted that like elements are referenced by like reference numerals or symbols and duplicate descriptions thereof will be omitted herein.

A laser apparatus and an extreme ultraviolet (EUV) light generation system including the laser apparatus according to selected embodiments of this disclosure will be described in detail with reference to the drawings. Embodiments of this disclosure will be illustrated following the table of contents below.

Contents
1. Summary
2. Terms
3. Overview of EUV Light Generation System
   3.1 Configuration
   3.2 Operation
   3.3 Burst Operation
4. Optical Shutter Control System in Laser Apparatus (First Embodiment)
   4.1 Configuration
   4.2 Operation
   4.3 Effect
5. Laser Apparatus in Which Master Oscillator Comprises Semiconductor Lasers (Second Embodiment)
   5.1 Configuration
   5.2 Operation
   5.3 Effect
6. Optical Shutters (Third Embodiment)
   6.1 Combination of Pockels Cell and Polarizers
   6.2 Combination of Faraday Rotator and Polarizers
   6.3 Acousto-optic Element
7. Extreme Ultraviolet Light Generation System Including Laser Apparatus (Fourth Embodiment)
   7.1 Configuration
   7.2 Operation
   7.3 Effect
8. Synchronization of Pulsed Laser Beam and Droplets (Fifth Embodiment)
   8.1 Configuration
   8.2 Timing Chart
   8.3 Flowchart
   8.4 Effect
9. Synchronization of Pulsed Laser Beam and Droplets Using Timing Sensor (Sixth Embodiment)
   9.1 Configuration
   9.2 Timing Chart
   9.3 Effect
   9.4 Configuration Examples of Timing Sensor
      9.4.1 Configuration Example 1
      9.4.2 Configuration Example 2
      9.4.3 Configuration Example 3
      9.4.4 Configuration Example 4
   9.5 Optical Delay Circuit
10. Synchronization of Pulsed Laser Beam and Droplets with Droplets as Reference (Seventh Embodiment)
   10.1 Configuration
   10.2 Operation
      10.2.1 Timing Chart
      10.2.2 Flowchart
      10.2.3 Effect
   10.3 Modifications of Operation
      10.3.1 Timing Chart
      10.3.2 Flowchart
      10.3.3 Effect
11. Variations of Optical Shutter (Modifications)
   11.1 First Modification
   11.2 Second Modification
   11.3 Third Modification
   11.4 Fourth Modification
12. Supplementary Description
   12.1 Regenerative Amplifier 1. Summary An LPP type EUV light generation system for an exposure apparatus may be required to output pulsed EUV light in burst. In line with this, a laser apparatus which includes a master oscillator and at least one amplifier may be required to output a pulsed laser beam in burst. When the laser apparatus is required to output a pulsed laser beam in burst, the following problems may arise.

When a master oscillator oscillates in burst so as to output a pulsed laser beam in burst, the oscillation of the master oscillator may become thermally unstable, which in turn may prevent the master oscillator from outputting a pulsed laser beam stably in burst. As a result, a burst of an unstable pulsed laser beam may be amplified in an amplifier, and in turn the unstable pulsed laser beam may be outputted from the amplifier in burst.

In the embodiments to be described below, an optical shutter may be disposed on a beam path of a pulsed laser beam outputted from a master oscillator, and a burst of the pulsed laser beam may be generated by switching the optical shutter.

2. Terms

Terms used in this disclosure will be defined as follows. The term "burst operation" may include the burst operation of the EUV light generation apparatus or system and the burst operation of the laser apparatus to be used with the EUV light generation apparatus or system. The burst operation of the EUV light generation apparatus or system may be such that a first predetermined period and a second predetermined period are repeatedly alternated for a predetermined period. The EUV light is outputted at a predetermined repetition rate during the first predetermined period, and the EUV light is not outputted during the second predetermined period. The burst operation of the laser apparatus may be such that a third predetermined period and a fourth predetermined period are repeatedly alternated for a predetermined period. The laser beam is outputted at a predetermined repetition rate during the third predetermined period, and the laser beam is not outputted during the fourth predetermined period. In this application, the first predetermined period is referred to as an "EUV light burst output period," and the second predetermined period is referred to as an "EUV light burst rest period." Further, the third predetermined period is referred to as a "laser beam burst output period," and the fourth predetermined period is referred to as a "laser beam burst rest period." Typically, the EUV light burst output period may be substantially the same in length as the laser beam burst output period. Further, the EUV light burst rest period may be substantially the same in length as the laser beam burst rest period. Here, the start and the end of the EUV light burst output period may respectively be delayed from the start and the end of the laser beam burst output period. Similarly, the start and the end of the EUV light burst rest period may respectively be delayed from the start and the end of the laser beam burst rest period.

The term "droplet" may refer to a liquid droplet of a molten target material. Accordingly, its shape may be substantially spherical due to its surface tension. The term "plasma generation region" may refer to a predefined three-dimensional space in which plasma is to be generated. The terms "upstream" and "downstream" may be defined with respect to the direction in which the laser beam outputted from the master oscillator travels toward the plasma generation region.

In this disclosure, Z-direction is defined as the direction into which the laser beam travels. X-direction is perpendicular to Z-direction, and Y-direction is perpendicular to both Z-direction and X-direction. Accordingly, X-direction and Y-direction may be rotated as the direction into which the laser beam travels is changed. For example, when the direction into which the laser beam travels (Z-direction) changed within X-Z plane, X-direction is rotated in accordance with the change in Z-direction, but Y-direction remains unchanged. Similarly, when the direction into which the laser beam travels (Z-direction) changes within Y-Z plane, Y-direction is rotated in accordance with the change in Z-direction, but X-direction remains unchanged. In order to facilitate understanding, the coordinate systems for the laser beam incident on the uppermost stream side optical element, of the optical elements depicted in a given drawing, and for the laser beam outputted from the downmost stream side optical element are shown appropriately in selected drawings. The coordinate systems for the laser beam incident on other optical elements are shown appropriately as necessary.

In an optical element, the "plane of incidence" refers to a plane perpendicular to the surface on which the laser beam is incident and containing the beam axis of the laser beam incident thereon. A polarization component perpendicular to the place of incident is referred to as the "S-polarization component," and a polarization component parallel to the place of incident is referred to as the "P-polarization component."

3. Overview of EUV Light Generation System 3.1 Configuration

FIG. 1 schematically illustrates the configuration of an exemplary EUV light generation system. An LPP type EUV light generation apparatus may be used with at least one laser apparatus 3. In this disclosure, a system including the LPP type EUV light generation apparatus and the laser apparatus 3 may be referred to as an EUV light generation system 1000. As illustrated in FIG. 1 and described in detail below, the EUV light generation system 1000 may include a sealed chamber 2, a target supply unit (droplet generator 26, for example), and so forth. The target supply unit may be mounted on the chamber 2 so as to penetrate its wall, for example. A target material to be supplied by the target supply unit may include, but not limited to, tin, terbium, gadolinium, lithium, xenon, or any combination thereof.

The chamber 2 may have at least one through-hole formed in its wall, and the through-hole may be covered by a window 21. An EUV collector mirror 23 having, for example, a spheroidal surface may be disposed inside the chamber 2. The EUV collector mirror 23 may have a multi-layered reflective film formed on the spherical surface to serve as the reflective surface, and the reflective film may include molybdenum and silicon being laminated alternately, for example. With this, of rays of light 251 emitted from plasma generated in a plasma generation region 25, EUV light 252 may be reflected selectively by the EUV collector mirror 23. The EUV collector mirror 23 may have first and second foci. The EUV collector mirror 23 may preferably be disposed such that the first focus lies in the plasma generation region 25 and the second focus lies in an intermediate focus (IF) 292, for example. The EUV collector mirror 23 may have a through-hole 24 formed at substantially the center thereof, and a pulsed laser beam 33 may travel through the through-hole 24 toward the plasma generation region 25.

Referring again to FIG. 1, the EUV light generation system 1000 may further include an EUV light generation controller 5 and a target sensor 4.

The EUV light generation system 1000 may include a connection 29 for allowing the interior of the chamber 2 and the interior of the exposure apparatus 6 to be in communication with each other. A wall 291 having an aperture may be disposed inside the connection 29, and the wall 291 may be disposed such that the second focus of the EUV collector mirror 23 lies in the aperture formed in the wall 291.

The EUV light generation system 1000 may further include a laser beam direction control unit 34, a laser beam focusing mirror 22, and a target collector 28 for collecting droplets 27. The target sensor 4 may be provided with an imaging function, and may be configured to detect the presence, trajectory, position, and so forth, of the droplets 27.

3.2 Operation

With reference to FIG. 1, the operation of the EUV light generation system 1000 will be described. A pulsed laser beam 31 outputted from the laser apparatus 3 may travel through the laser beam direction control unit 34, and as a pulsed laser beam 32, may enter the chamber 2. Here, the pulsed laser beam 32 may pass through the window 21 to enter the chamber 2. The pulsed laser beam 32 may travel into the chamber 2 along at least one beam path from the laser apparatus 3, be reflected by the laser beam focusing mirror 22, and strike at least one droplet 27.

The droplet generator 26 may be configured to output the droplets 27 toward the plasma generation region 25 inside the chamber 2. The droplet 27 may be irradiated with at least one pulse included in the pulsed laser beam 33. The droplet 27 that has been irradiated with the pulsed laser beam 33 may be turned into plasma, and the EUV light may be emitted from the plasma. Here, the droplet 27 may be irradiated with multiple pulses.

The EUV light generation controller 5 may control the overall operation of the EUV light generation system 1000. The EUV light generation controller 5 may process image data or the like of the droplets 27 captured by the target sensor 4. Further, the EUV light generation controller 5 may control, for example, the timing at which and the direction into which the droplet 27 is outputted. Furthermore, the EUV light generation controller 5 may control, for example, the timing at which the laser apparatus 3 oscillates, the direction in which the pulsed laser beam 31 travels, the position at which the pulsed laser beam 33 is focused, and so forth. The controls mentioned above are merely examples, and other controls may be added as necessary.

3.3 Burst Operation

Figure 2:
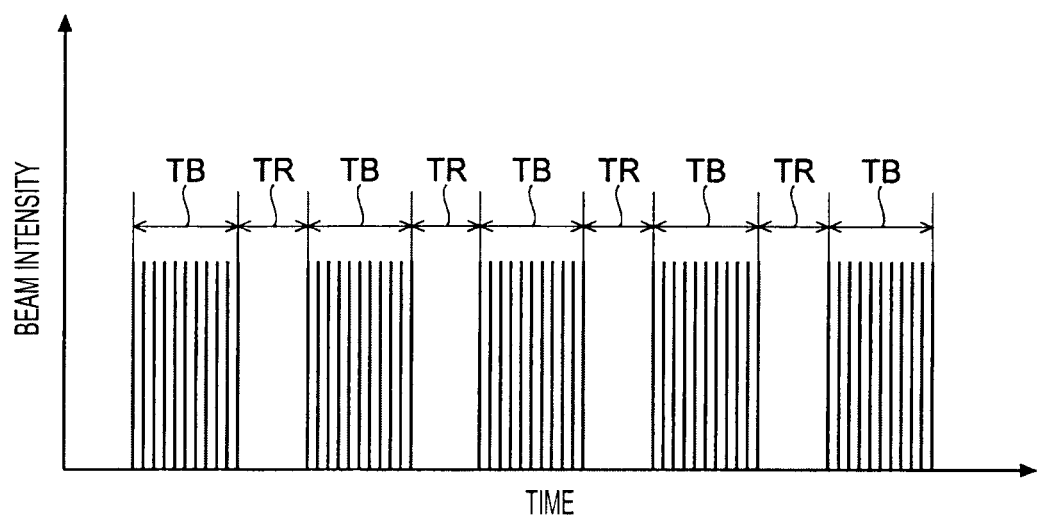
FIG. 2 shows the operation of the EUV light generation system shown in FIG. 1.

FIG. 2 shows the operation of the EUV light generation system shown in FIG. 1.

In lithography in which the EUV light generation system 1000 is used, a semiconductor wafer may be exposed with the pulsed EUV light 252 of a predetermined repetition rate. During a period in which a wafer is moved or replaced, or a mask is replaced, the exposure with the EUV light 252 may be paused. In this case, as shown in FIG. 2, an EUV light burst output period TB and an EUV light burst rest period TR may be repeatedly alternated.

Typically, when the EUV light burst output period TB and the EUV light burst rest period TR are repeatedly alternated by the EUV light generation system 1000, a laser beam burst output period and a laser beam burst rest period may be repeatedly alternated by the laser apparatus 3. In this disclosure, a plurality of pulses of the pulsed laser beams 31 outputted during the laser beam burst output period may be referred to as burst pulses.

When a burst of the pulsed laser beam 31 is generated, the master oscillator in the laser apparatus 3 may be controlled to oscillate in burst. However, when the master oscillator is controlled to oscillate in burst, the oscillation of the master oscillator may become thermally unstable, which may make it difficult to generate a burst of the pulsed laser beam 31 with stable energy. When burst pulses outputted from the master oscillator are unstable, the unstable burst pulses may be amplified in an amplifier, and in turn unstable amplified burst pulses may be outputted from the amplifier. Thus, an optical shutter may be disposed on a beam path of burst pulses outputted from the master oscillator, and the burst of the pulsed laser beam may be generated by switching the optical shutter.

4. Optical Shutter Control System in Laser Apparatus (First Embodiment)

4.1 Configuration

Figure 3:
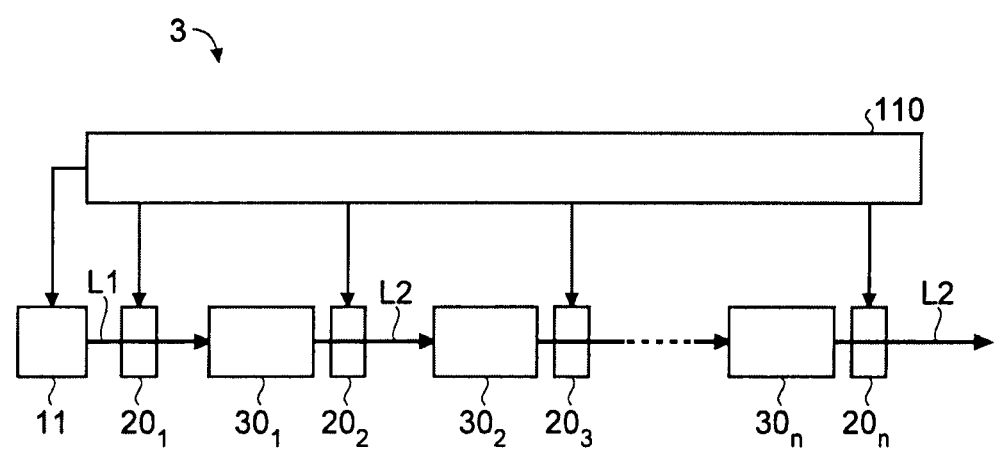
FIG. 3 schematically illustrates the configuration of a laser apparatus according to a first embodiment of this disclosure.

A laser apparatus according to a first embodiment of this disclosure will be described in detail with reference to the drawings. FIG. 3 schematically illustrates the configuration of the laser apparatus according to the first embodiment. As illustrated in FIG. 3, the laser apparatus 3 may include a master oscillator (MO) 11, amplifiers (PA) $30_1$ through $30_n$, optical shutters $20_1$ through $20_n$, and a controller 110. In this disclosure, the amplifiers (PA) $30_1$ through $30_n$ are commonly referred to by amplifier 30 or amplifiers 30. Similarly, the optical shutters $20_1$ through $20_n$ are commonly referred to by optical shutter 20 or optical shutters 20.

The optical shutter $20_1$ may be disposed on a beam path of a pulse laser beam outputted from the master oscillator 11 (hereinafter, a single pulse in the burst pulses may be referred as a pulse laser beam L1). Further, at least one optical shutter 20 may be disposed on a beam path of a pulse laser beam L2 amplified by an amplifier 30. In the example illustrated in FIG. 3, the optical shutters $20_2$ through $20_n$ may be disposed respectively at output sides of the amplifiers $30_1$ through $30_n$.

4.2 Operation

Figure 4:
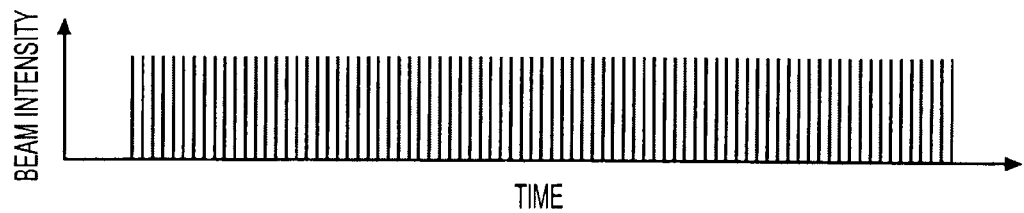
FIG. 4 illustrates an example of a pulsed laser beam outputted from a master oscillator shown in FIG. 3.
Figure 5:
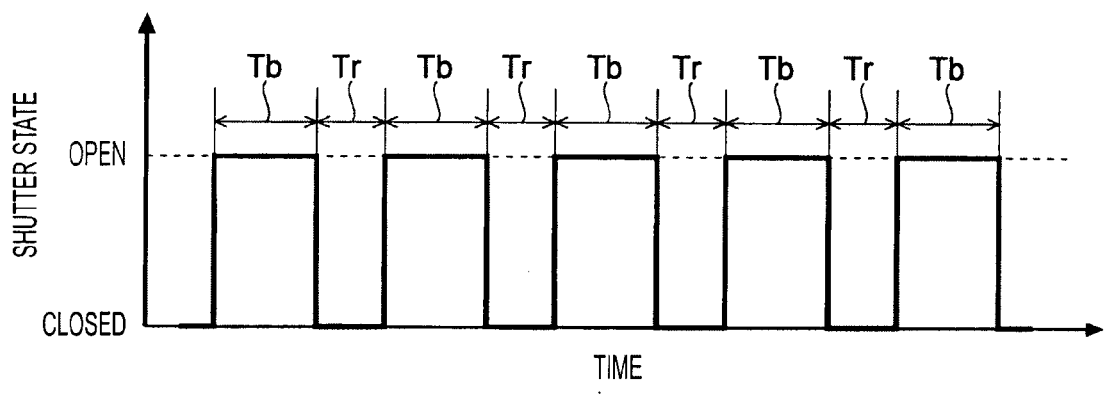
FIG. 5 illustrates an example of the operation of an optical shutter shown in FIG. 3.
Figure 6:
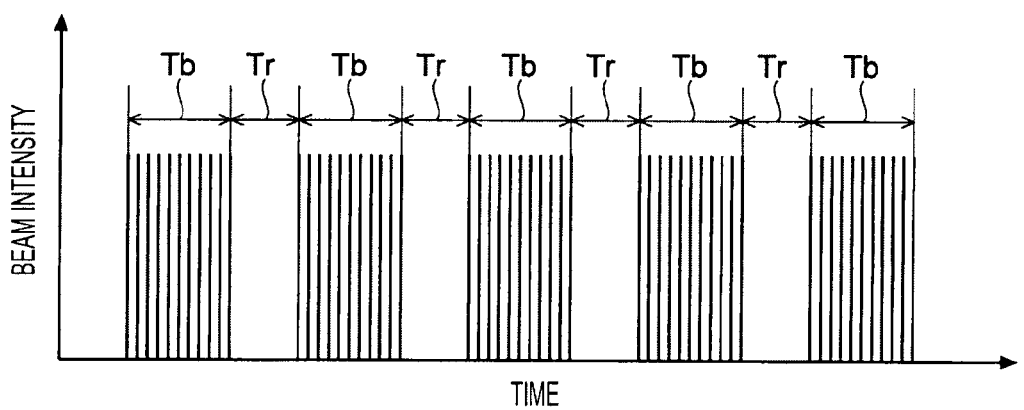
FIG. 6 illustrates an example of an amplified pulsed laser beam outputted from the laser apparatus shown in FIG. 3.

The general operation of the laser apparatus 3 shown in FIG. 3 will be described in detail with reference to the drawings. FIG. 4 illustrates an example of a pulsed laser beam outputted from the master oscillator shown in FIG. 3. FIG. 5 illustrates an example of the operation of the optical shutter shown in FIG. 3. FIG. 6 illustrates an example of an amplified pulsed laser beam outputted from the laser apparatus shown in FIG. 3.

The controller 110 may be coupled to the master oscillator 11 to output trigger signals at a predetermined repetition rate to the master oscillator 11. With this, pulse laser beams L1 may be outputted continually from the master oscillator 11 at the predetermined repetition rate, as illustrated in FIG. 4.

A burst output request and a burst rest request of the EUV light may be inputted to the controller 110 from the exposure apparatus 6, for example. In this disclosure, a laser beam burst output period Tb may correspond to a period from the input of a burst output request to the input of a burst rest request. A laser beam burst rest period Tr may correspond to a period from the input of a burst rest request to the input of a subsequent burst output request.

As illustrated in FIG. 5, the controller 110 may open the optical shutter 20 during the laser beam burst output period Tb and close the optical shutter 20 during the laser beam burst rest period Tr. With this, as illustrated in FIG. 6, the laser apparatus 3 may output a burst of the pulsed laser beam 31 during the laser beam burst output period Tb and may pause the output of the pulsed laser beam 31 during the laser beam burst rest period Tr. Here, opening an optical shutter allows the pulsed laser beam to pass through the optical shutter, and closing an optical shutter causes the pulsed laser beam to be blocked by the optical shutter.

4.3 Effect

In this way, the master oscillator 11 may be controlled to oscillate continually at a predetermined repetition rate. This can stabilize the master oscillator 11 thermally. With this, the pulse laser beams L1 with stable energy may be obtained. Energy of the pulse laser beams 12, which are obtained by amplifying the pulse laser beams L1 with stable energy, may also be stabilized. As a result, the pulsed laser beam 31 with stable energy may be obtained. Further, in the first embodiment, a burst of the pulse laser beams L2 with stable energy may be generated by switching the optical shutter 20. With this, the burst pulses of the pulse laser beams L2 may also be stabilized.

5. Laser Apparatus in which Master Oscillator Comprises Semiconductor Lasers (Second Embodiment)

5.1 Configuration

Figure 7:
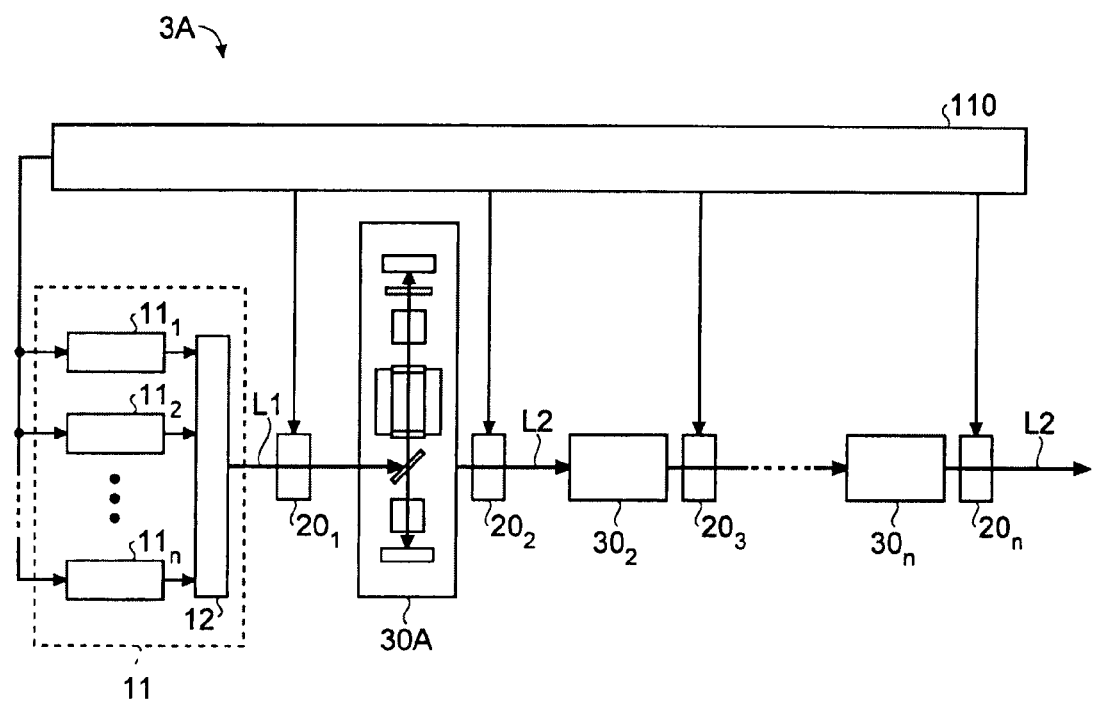
FIG. 7 schematically illustrates the configuration of a laser apparatus according to a second embodiment of this disclosure, in which a master oscillator is configured of a plurality of semiconductor lasers.

In the laser apparatus 3 shown in FIG. 3, the master oscillator 11 may comprise a plurality of semiconductor lasers. FIG. 7 schematically illustrates the configuration of a laser apparatus 3A according to a second embodiment of this disclosure, in which the master oscillator comprises a plurality of semiconductor lasers. In the configuration shown in FIG. 7, quantum cascade lasers (QCL) may be used as semiconductor lasers $11_1$ through $11_n$. However, any other semiconductor lasers, such as a distributed-feedback type semiconductor, can be used. Further, in the configuration shown in FIG. 7, a regenerative amplifier 30A may serve as the first stage amplifier $30_n$.

As illustrated in FIG. 7, the master oscillator 11 may include the semiconductor lasers $11_1$ through $11_n$. Each of the semiconductor lasers $11_1$ through $11_n$ may oscillate in a single-longitudinal mode or in a multi-longitudinal mode. Here, a wavelength of each of the longitudinal modes may preferably be contained in any of the band widths of the gain medium in the amplifiers $30_1$ through $30_n$ (including the regenerative amplifier 30A). A $CO_2$ gas may be used, for example, as a gain medium for the amplifiers $30_1$ through $30_n$ (including the regenerative amplifier 30A). The gain medium containing an excited $CO_2$ gas may have the band widths of modes P(18), P(20), P(22), P(24), P(26), P(28), P(30), and so forth.

Pulsed laser beams outputted from the respective semiconductor lasers $11_1$ through $11_n$ may be incident on a beam path adjusting unit 12. The beam path adjusting unit 12 may be configured to control the beam paths of the respective pulsed laser beams outputted from the semiconductor lasers $11_1$ through $11_n$ to substantially coincide with one another. With this, the pulse laser beam L1 containing a plurality of pulse laser beams may be outputted from the master oscillator 11. The beam path adjusting unit 12 may include a grating, a prism, a mirror, or the like, for example.

The semiconductor lasers $11_1$ through $11_n$ may oscillate at different wavelengths from one another, respectively, or at the same wavelength as one another. Further, the semiconductor lasers $11_1$ through $11_n$ may oscillate such that the respective pulse laser beams are outputted simultaneously from the beam path adjusting unit 12 or such that the respective pulse laser beams are outputted successively from the beam path adjusting unit 12 with a predetermined time lag. When the semiconductor lasers $11_1$ through $11_n$ are controlled to oscillate such that the respective pulse laser beams are outputted simultaneously from the beam path adjusting unit 12, a pulse laser beam L1 with high peak intensity may be obtained. On the other hand, when the semiconductor lasers $11_1$ through $11_n$ are controlled to oscillate such that the respective pulse laser beams are outputted successively from the beam path adjusting unit 12 with a predetermined time lag, a pulse laser beam L1 with various waveforms may be obtained by modifying the time lag.

In the above configuration, the optical shutters 20 may be disposed respectively at the output sides of the amplifiers $30_1$ through $30_n$ (including the regenerative amplifier 30A). Further, the optical shutter 20 may be disposed at the output side of the master oscillator 11.

5.2 Operation

Figure 8:
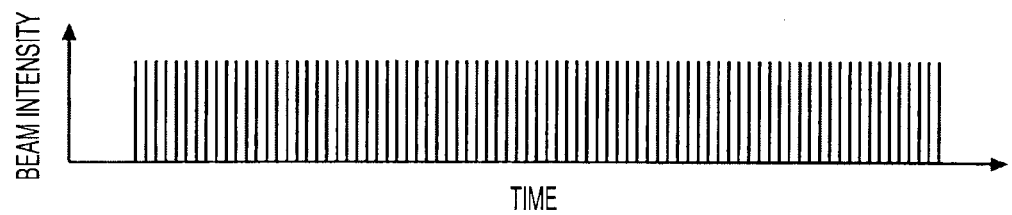
FIG. 8 illustrates an example of a pulsed laser beam outputted from the master oscillator shown in FIG. 7.
Figure 9:
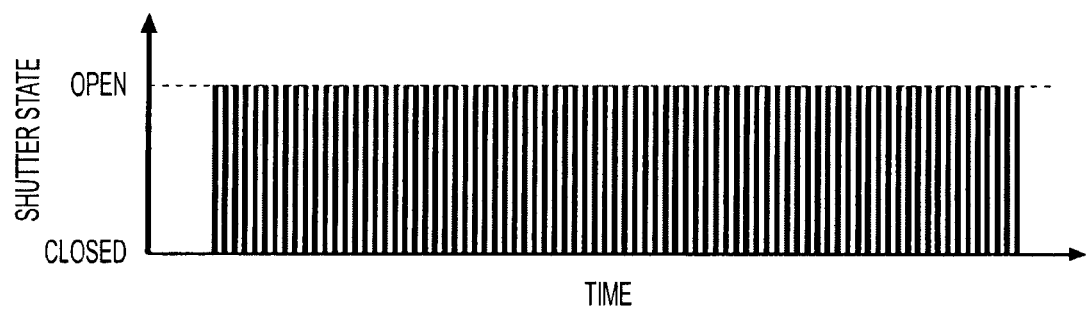
FIG. 9 shows the operation of an optical shutter disposed at the output side of the master oscillator shown in FIG. 7.
Figure 10:
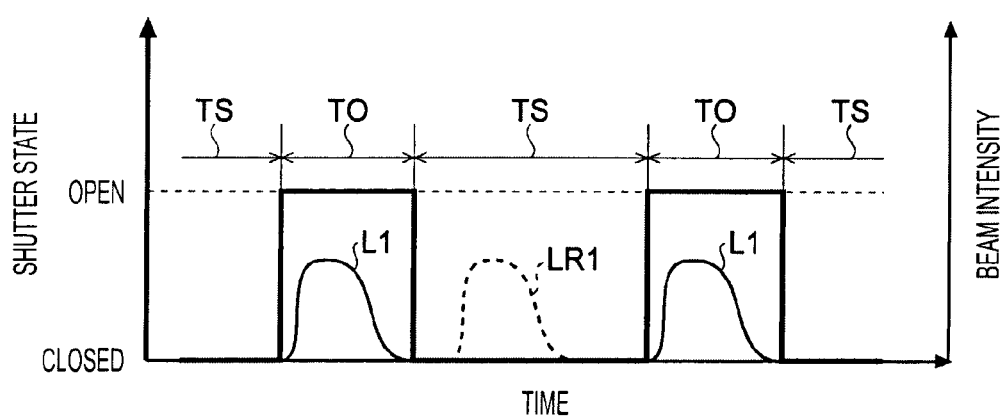
FIG. 10 shows the relationship between individual pulse laser beams shown in FIG. 8 and the operation of the optical shutter shown in FIG. 9.
Figure 11:
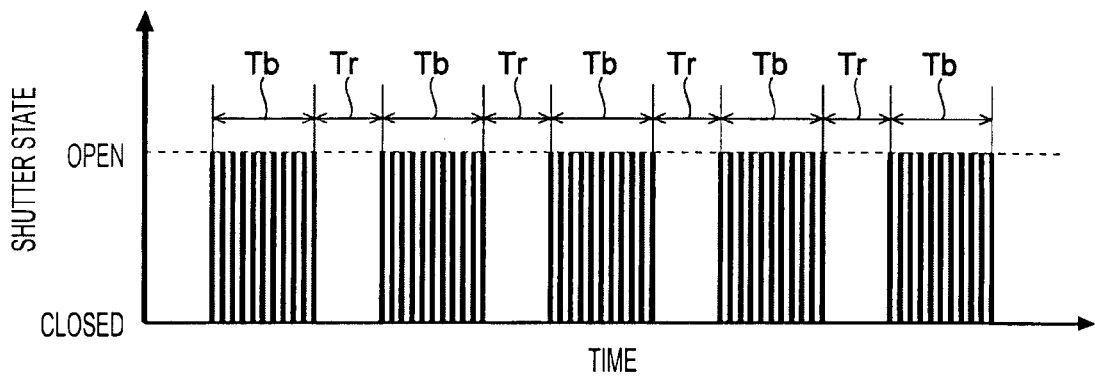
FIG. 11 shows the operation of an optical shutter disposed at the output side of an amplifier (including a regenerative amplifier) shown in FIG. 7.
Figure 12:
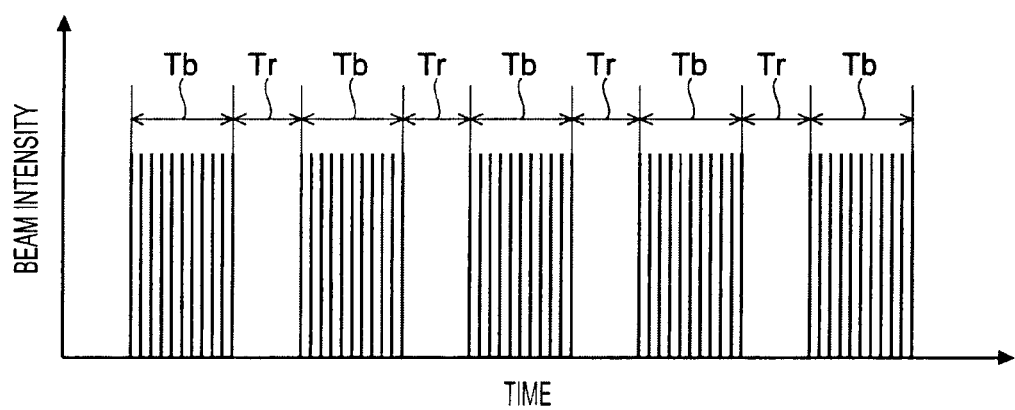
FIG. 12 illustrates an example of an amplified pulsed laser beam outputted from the laser apparatus shown in FIG. 7.

The operation of the laser apparatus 3A shown in FIG. 7 will be described in detail with reference to the drawings. FIG. 8 illustrates an example of the pulsed laser beam outputted from the master oscillator shown in FIG. 7. FIG. 9 shows the operation of the optical shutter disposed at the output side of the master oscillator shown in FIG. 7. FIG. 10 shows the relationship between individual pulse laser beams shown in FIG. 8 and the operation of the optical shutter shown in FIG. 9. FIG. 11 shows an example of the operation of the optical shutter disposed at the output side of an amplifier (including the regenerative amplifier) shown in FIG. 7. FIG. 12 illustrates an example of an amplified pulsed laser beam outputted from the laser apparatus shown in FIG. 7.

The controller 110 may output trigger signals at a predetermined repetition rate to the respective semiconductor lasers $11_1$ through $11_n$. The trigger signals may be inputted to the respective semiconductor lasers $11_1$ through $11_n$ at the same timing or at differing timing. With this, pulse laser beams L1, of which the beam paths have been controlled to coincide with one another by the beam path adjusting unit 12, may be outputted continually from the master oscillator 11 at the predetermined repetition rate, as illustrated in FIG. 8.

Further, the controller 110 may switch the optical shutter $20_1$ disposed at the output side of the master oscillator 11 with respect to each pulse laser beam L1 outputted from the master oscillator 11. To be more specific, as illustrated in FIG. 10, the controller 110 may open the optical shutter $20_1$ during a period TO in which a single pulse laser beam L1 passes through the optical shutter $20_1$ and may close the optical shutter $20_1$ other than the above period, which is a period TS. In this disclosure, an open period TO may refer to a period during which the optical shutter $20_1$ is open, and a shutoff period TS may refer to a period during which the optical shutter $20_1$ is closed. By closing the optical shutter $20_1$ while a pulse laser beam L is not passing through the optical shutter $20_1$, a laser beam LR1 reflected by the target material as the target material is irradiated by the pulsed laser beam 33 may be prevented from traveling back to the master oscillator 11.

The controller 110 may keep at least one of the optical shutters 20 disposed subsequent to the respective amplifiers open during the laser beam burst output period Tb. The optical shutters 20 that are not kept open may be opened or closed on a pulse to pulse basis (see FIG. 10). Meanwhile, the controller 110 may keep at least one of the optical shutters 20 closed during the laser beam burst rest period Tr. With this, a burst of amplified pulse laser beams L2 may be generated, as illustrated in FIG. 12. Further, as in the control of the optical shutter $20_1$ disposed at the output side of the master oscillator 11 (see FIG. 10), the controller 110 may keep each of the optical shutters 20 open while the pulse laser beam L2 from the respective amplifiers 30 travels through the respective optical shutters 20 and close the optical shutters 20 other than the above period. With this, self-oscillation in the amplifiers 30 may be suppressed, and a laser beam reflected by the target material as the target material is irradiated by the pulsed laser beam 33 may be prevented from traveling back to the amplifiers.

5.3 Effect

In this way, according to the second embodiment, even when the plurality of the semiconductor lasers $11_1$ through $11_n$ is used, the semiconductor lasers $11_1$ through $11_n$ may be controlled to oscillate continually at a predetermined repetition rate, respectively. As a result, the semiconductor lasers $11_1$ through $11_n$ may be stabilized thermally. Further, in the second embodiment, the regenerative amplifier 30A may amplify the pulse laser beams L1 continually at a predetermined repetition rate. With this, burst pulses of the amplified pulse laser beams L2 may also be stabilized. As a result, a burst pulse of the pulse laser beams L2 amplified in a downstream amplifier 30 may be stabilized as well.

Further, in the second embodiment, the optical shutters 20 may be switched on a pulse to pulse basis (see FIG. 10). With this, the optical shutters 20 may block a laser beam reflected inside the amplifiers 30 or in the chamber 2 (See FIG. 1) and traveling back toward the master oscillator 11. As a result, the semiconductor lasers $11_1$ through $11_n$ in the master oscillator 11 or the regenerative amplifier 30A may be prevented from being damaged by a self-oscillation beam or the reflected laser beam.

6. Optical Shutters (Third Embodiment)

Specific examples of the above-described optical shutters will be described in detail, as a third embodiment, with reference to the drawings.

6.1 Combination of Pockels Cell and Polarizers

Figure 13:
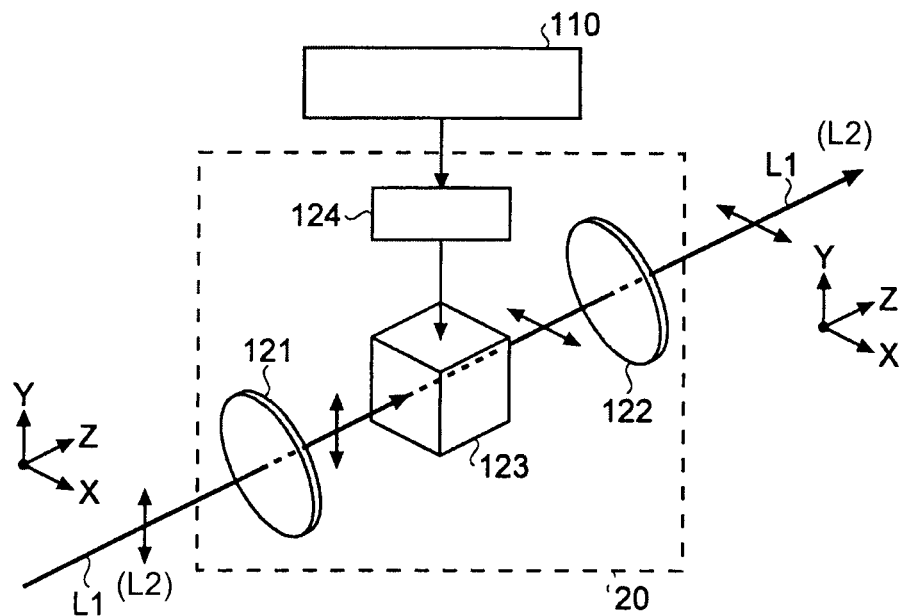
FIG. 13 illustrates an example of an optical shutter according to a third embodiment of this disclosure, which is configured of two polarizers and a Pockels cell.

FIG. 13 illustrates an example of the optical shutter including two polarizers and a Pockels cell according to the third embodiment. A Pockels cell typically has responsiveness in a few nanoseconds, and is considered to be suitable as an optical shutter in a laser apparatus, where high-speed switching is required. When the optical shutter shown in FIG. 13 is used as optical shutter $20_1$, input and output laser beams are indicated as L. When the optical shutter shown in FIG. 13 is used as one of optical shutters $20_2$-$20_n$, input and output laser beams are indicated as L2.

In the configuration shown in FIG. 13, a polarizer 121 may, for example, transmit, of a laser beam incident thereon, a Y-polarization component and block an X-polarization component. Meanwhile, a polarizer 122 may, for example, transmit, of a laser beam incident thereon, an X-polarization component and block a Y-polarization component. In this way, the polarizers 121 and 122 may transmit the polarization components of different directions. In this example, the polarizers 121 and 122 may be disposed such that the polarization direction of the laser beam transmitted through the polarizer 121 may differ by 90 degrees from that of the laser beam transmitted through the polarizer 122.

High-voltage pulses may be applied to a Pockels cell 123 by a high-voltage power source 124 under the control of the controller 110. The Pockels cell 123 may rotate the polarization direction of the laser beam incident thereon while the high-voltage pulse is being applied thereto, for example. In this example, such high-voltage pulse that rotates the polarization direction of the incident beam by 90 degrees may be applied to the Pockels cell 123.

The pulse laser beam L1 incident on the optical shutter 20 (e.g., optical shutter $20_1$) configured as described above may first be incident on the polarizer 121. The polarizer 121 may transmit, of the pulse laser beam L incident thereon, a polarization component in Y-direction (hereinafter, referred to as Y-polarization pulse laser beam). The Y-polarization pulse laser beam having been transmitted through the polarizer 121 may be incident on the Pockels cell 123.

While the high-voltage pulse is not applied to the Pockels cell 123, the Y-polarization pulse laser beam incident on the Pockels cell 123 may be outputted from the Pockels cell 123 without having its polarization direction be changed. The outputted Y-polarization pulse laser beam may be incident on the polarizer 122. The polarizer 122 may either reflect or absorb the Y-polarization pulse laser beam incident thereon. As a result, the pulse laser beam L1 may be blocked by the optical shutter 20 (e.g., optical shutter $20_1$).

On the other hand, while the high-voltage pulse is applied to the Pockels cell 123, the polarization direction of the Y-polarization pulse laser beam incident on the Pockels cell 123 may be rotated by 90 degrees. As a result, a linearly polarized pulse laser beam in X-direction (hereinafter, referred to as X-polarization pulse laser beam) may be outputted from the Pockels cell 123. The outputted X-polarization pulse laser beam may be incident on the polarizer 122. The polarizer 122 may transmit the X-polarization pulse laser beam incident thereon. As a result, the pulse laser beam L1 may be outputted from the optical shutter 20. The pulse laser beam L1 outputted from the optical shutter 20 may be converted to the Y-polarization pulse laser beam by a polarizer (not shown) and then may enter the amplifier 30 disposed downstream therefrom.

Here, as described with reference to FIG. 10, when the high-voltage pulse is applied to the Pockels cell 123 in synchronization with timing at which the pulse laser beam L1 (or L2) passes through the optical shutter 20, the optical shutter 20 may serve to suppress a self-oscillation beam or a laser beam returning from the amplifiers 30 disposed downstream therefrom. Even in that case, as described with reference to FIG. 11, a burst of the pulse laser beams L2 (from, e.g., each of optical shutters $20_1$-$20_n$) may be generated by stopping the application of the high-voltage pulse to the Pockels cell 123 during the laser beam burst rest period Tr. That is, the optical shutter 20 may serve to suppress the self-oscillation beam or the returning laser beam and also to generate a burst of the pulse laser beams L2.

Figure 14:
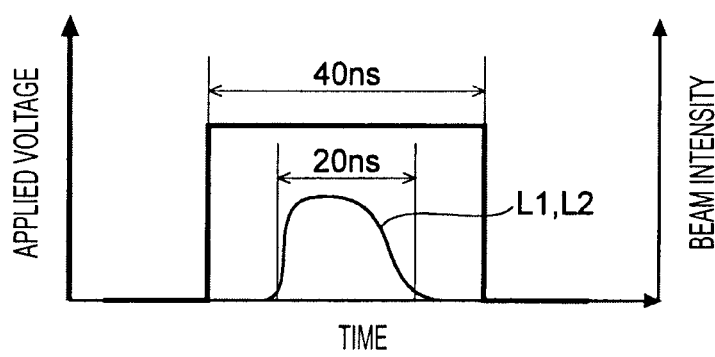
FIG. 14 shows the relationship between a single pulse laser beam and the operation of the optical shutter according to the third embodiment.

As illustrated in FIG. 14, it is preferable that a high-voltage pulse of such duration that a temporal jitter of the pulse laser beams L1 and L2 can be absorbed is applied to the Pockels cell 123. For example, when the pulse width of the pulse laser beams L1 and L2 is 20 ns, the pulse width of the high-voltage pulse may be approximately 40 ns. Here, when the pulse width of the high-voltage pulse is too large, the returning laser beam may not be blocked. Accordingly, the pulse width of the high-voltage pulse may preferably be set appropriately.

In this example, the polarization direction of the laser beam transmitted through the polarizer 121 and that of the laser beam transmitted through the polarizer 122 may differ by 90 degrees. Accordingly, the optical shutter 20 may transmit the pulse laser beams L1 and L2 while the high-voltage pulse is applied to the Pockels cell 123. However, this disclosure is not limited thereto. For example, the polarization direction of the laser beam transmitted through the polarizer 121 and that of the laser beam transmitted through the polarizer 122 may be the same as each other. In that case, the optical shutter 20 may transmit the pulse laser beams L1 and L2 while the high-voltage pulse is not applied to the Pockels cell 123.

6.2 Combination of Faraday Rotator and Polarizers

Figure 15:
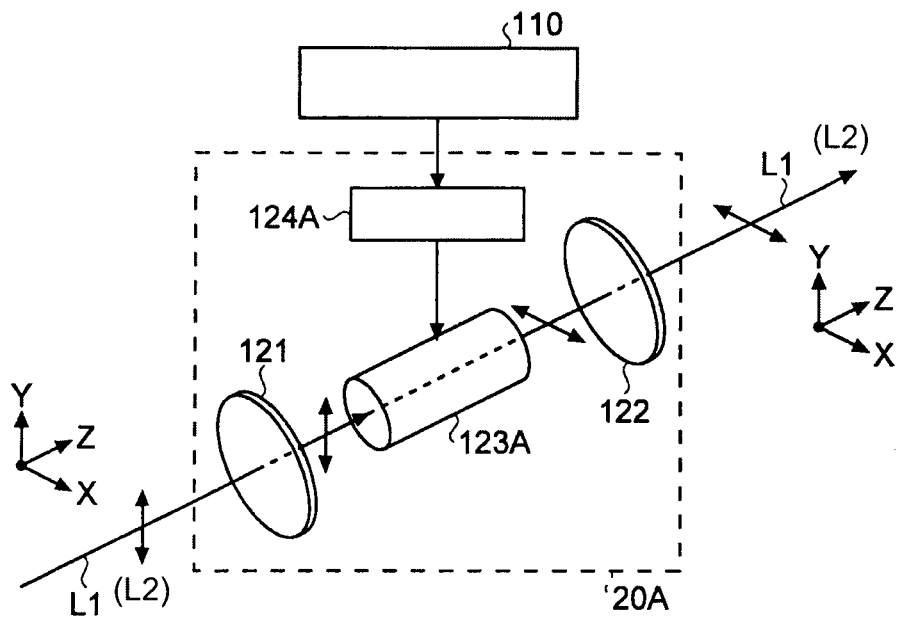
FIG. 15 illustrates an example of an optical shutter according to the third embodiment, which is configured of two polarizers and a Faraday rotator.

FIG. 15 illustrates an example of the optical shutter including two polarizers and a Faraday rotator according to the third embodiment.

As illustrated in FIG. 15, in an optical shutter 20A, the Pockels cell 123 and the high-voltage power source 124 in the optical shutter 20 shown in FIG. 13 may be replaced by a Faraday rotator 123A and a magnetic field generation source 124A, respectively. Other configurations may be similar to the optical shutter 20 in FIG. 13.

Voltage may be applied to the Faraday rotator 123A by the magnetic field generation source 124A under the control of the controller 110. The Faraday rotator 123A may rotate the polarization direction of a laser beam incident thereon while voltage is being applied thereto, for example. In this example, voltage for generating a magnetic field of such intensity that rotates the polarization direction of the incident laser beam by 90 degrees may be applied to the Faraday rotator 123A.

In this way, using the Faraday rotator 123A in place of the Pockels cell 123 may also make it possible to implement the optical shutter 20A that serves to suppress the self-oscillation beam or the returning laser beam and also to generate a burst of the pulse laser beams L2.

6.3 Acousto-optic Element

Figure 16:
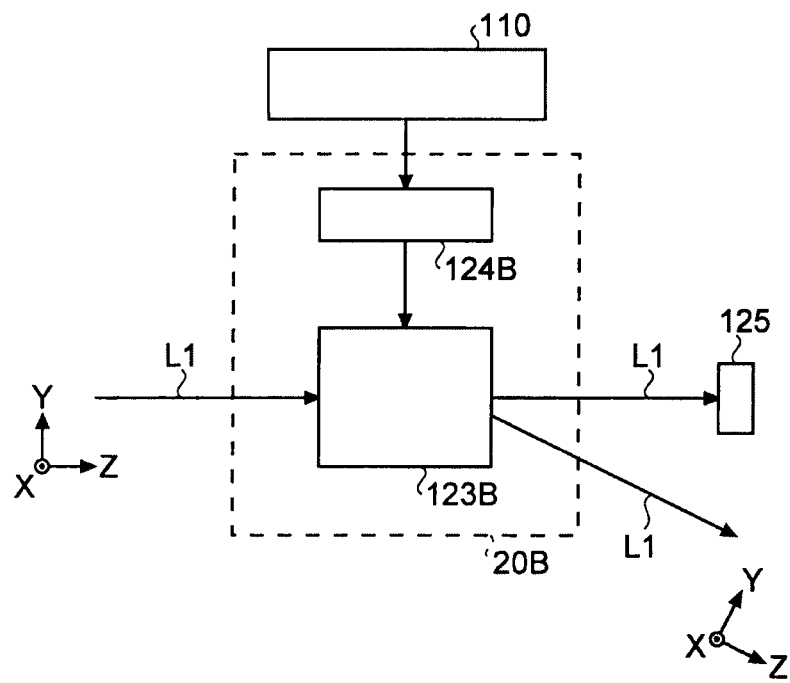
FIG. 16 illustrates an example of an optical shutter according to the third embodiment, which is configured of an acousto-optic element.

FIG. 16 illustrates an example of the optical shutter including an acousto-optic element according to the third embodiment.

Radio-frequency (RF) signals may be inputted to an acousto-optic element 123B by an RF generator 124B under the control of the controller 110. The acousto-optic element 123B may change the direction of a laser beam while the RF signal is applied thereto, for example. In this example, the amplifier 30 may be disposed to receive the pulse laser beam L1 (or L2) whose traveling direction is changed when the RF signal is applied to the acousto-optic element 123B. Further, when it is assumed that the optical shutter 20B in FIG. 16 is applied to optical shutter $20_n$, the direction into which the pulse laser beam L2 may be outputted while the RF signal is applied to the acousto-optic element 123B may be set to the direction in which the pulsed laser beam 31 is outputted from the laser apparatus 3.

In this way, the acousto-optic element 123B can be used to implement the optical shutter 20B that serves to suppress the self-oscillation beam or the returning laser beam and also to generate a burst of the pulse laser beams L2. Here, a beam dump 125 or the like may be disposed for absorbing the pulse laser beam L1 (or L2) whose traversing direction is not changed while the RF signal is not inputted to the acousto-optic element 123B. The location of the beam dump 125 and that of the amplifier 30 may be switched; if this is the case, the optical shutter 20B may be configured to transmit the pulse laser beams L and L2 while the RF signal is not inputted to the acousto-optic element 123B.

7. Extreme Ultraviolet Light Generation System Including Laser Apparatus (Fourth Embodiment)

7.1 Configuration

Figure 17:
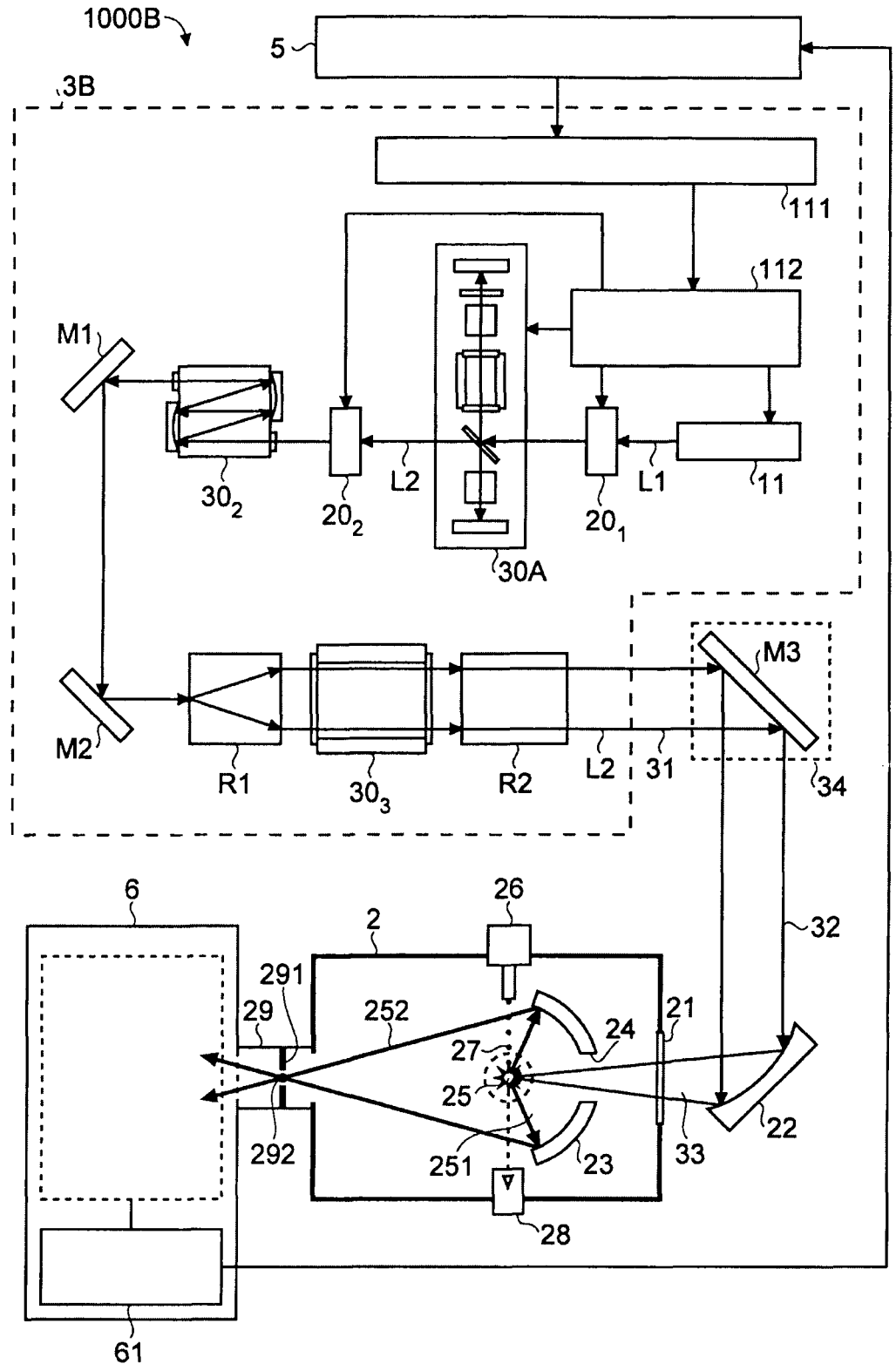
FIG. 17 schematically illustrates the configuration of an EUV light generation system according to a fourth embodiment of this disclosure.

An example of an EUV light generation system including the above-described laser apparatus will be described in detail with reference to the drawings. FIG. 17 schematically illustrates the configuration of the EUV light generation system according to a fourth embodiment.

As illustrated in FIG. 17, an EUV light generation system 1000B may include a laser apparatus 3B, the chamber 2, and the EUV light generation controller 5. The laser apparatus 3A shown in FIG. 7 may be used as the laser apparatus 3B, for example. Here, for simplifying the description, only the optical shutters $20_1$ and $20_2$ may be disposed at the output sides of the master oscillator 11 and the regenerative amplifier 30A, respectively, in the configuration shown in FIG. 17. Further, in the laser apparatus 3B, the amplifier $30_2$ may be a preamplifier, and the amplifier $30_3$ may be a main amplifier.

The laser apparatus 3B may include high-reflection mirrors M1 and M2 and relay optical systems R1 and R2, in addition to the configuration of the laser apparatus 3A shown in FIG. 7. The high-reflection mirrors M1 and M2 may collectively serve as an optical system for guiding the amplified pulse laser beam L2 outputted from the amplifier $30_2$ to the amplifier $30_3$. The laser beam direction control unit 34 may be disposed on the beam path of the pulsed laser beam 31 outputted from the laser apparatus 3B. The laser beam direction control unit 34 may include a high-reflection mirror M3. The direction into which the pulsed laser beam 32 is reflected by the high-reflection mirror M3 may be modified by actuating an actuator (not shown) mounted to the high-reflection mirror M3. The relay optical system R1 may expand the pulse laser beam L2 in diameter so that the pulse laser beam L2 passes through the amplification region of the amplifier $30_3$ efficiently. The relay optical system R2 may collimate the pulse laser beam L2 outputted from the amplifier $30_3$.

The above-described controller 110 (see FIGS. 3 and 7) may include a laser controller 111 and a timing controller 112 of the laser apparatus 3B. The laser controller 111 may control the overall operation of the laser apparatus 3B. The timing controller 112 may control the timing at which the master oscillator 11 oscillates, the operation of the regenerative amplifier 30A, the operation of the optical shutters $20_1$ and $20_2$, and so forth.

The pulsed laser beam 32 that has passed through the laser beam direction control unit 34 may be reflected by the laser beam focusing mirror 22, to thereby be focused, as the pulsed laser beam 33, in the plasma generation region 25. The chamber 2 may be provided with the window 21 for airtightly sealing the chamber 2, and the pulsed laser beam 33 may pass through the window 21 to enter the chamber 2. The window 21 may be formed of diamond, for example.

Further, the chamber 2 may include the droplet generator 26 and the EUV collector mirror 23. The droplet generator 26 may supply the target material serving as a source for generating the EUV light to the plasma generation region 25. In this example, molten tin (Sn) may be supplied in the form of droplets 27, for example. On an extension of the trajectory of the droplet 27, the target collector 28 may be disposed for collection the target material that has not contributed to the generation of the EUV light.

The EUV light generation system 1000B may be configured to focus the pulsed laser beam 33 in the plasma generation region 25 in synchronization with the timing at which the droplet 27 arrives in the plasma generation region 25. When the droplet 27 is irradiated with the pulsed laser beam 33, the target material constituting the droplet 27 may be turned into plasma, and the rays of light 251 including the EUV light 252 may be emitted from the plasma. The EUV collector mirror 23 may selectively reflect, of the light 251, the EUV light 252. The reflected EUV light 252 may be focused in the intermediate focus 292 and then be outputted to the exposure apparatus 6. In the exposure apparatus 6, the EUV light 252 may be used for semiconductor lithography or the like.

7.2 Operation

The operation of the EUV light generation system 1000B shown in FIG. 17 will be described. The operation of the EUV light generation system 1000B may be controlled by the EUV light generation controller 5. The burst output request may be inputted to the EUV light generation controller 5 from an exposure apparatus controller 61 of the exposure apparatus 6, for example. The EUV light generation controller 5, responsive to the burst output request, may output the burst output request to the laser controller 111. The laser controller 111, responsive to the burst output request, may control the timing controller 112 to provide the master oscillator 11 with the trigger signals at a predetermined repetition rate. Further, the laser controller 111 may control the timing controller 112 to operate the regenerative amplifier 30A and the optical shutters $20_1$ and $20_2$. The operation of the optical shutters $20_1$ and $20_2$ may be similar to that shown in FIGS. 9 and 11. Further, the regenerative amplifier 30A may amplify the pulse laser beam L1 and output the amplified pulse laser beam L2 to optical shutter $20_2$. With such operation, the pulsed laser beam 31 may be outputted in burst from the laser apparatus 3B at the predetermined repetition rate. As a result, the EUV light 252 may be outputted in burst from the EUV light generation system 1000B at the predetermined repetition rate.

7.3 Effect

As has been described so far, the master oscillator 11 may be protected from the self-oscillation beam or the returning laser beam by switching the optical shutters 20 for each pulse. Further, the master oscillator 11 and the regenerative amplifier 30A may be made to operate continually at a predetermined repetition rate, which may reduce fluctuation in the master oscillator 11 and in the regenerative amplifier 30A caused by a heat load. As a result, the stability of the pulse laser beams L2 outputted from the regenerative amplifier 30A may be improved.

Further, the burst rest request may be inputted to the EUV light generation controller 5 from the exposure apparatus controller 61, for example. The EUV light generation controller 5, responsive to the burst rest request, may output the burst rest request to the laser controller 111. The laser controller 111 may close the optical shutter 20 during the laser beam burst rest period Tr. With this, the pulse laser beam 33 may not be outputted from the laser apparatus 3B. As a result, the generation of the EUV light 252 may be paused.

8. Synchronization of Pulsed Laser Beam and Droplets (Fifth Embodiment)

Synchronization of the pulsed laser beam and the droplets will be described in detail, as a fifth embodiment, with reference to the drawings.

8.1 Configuration

Figure 18:
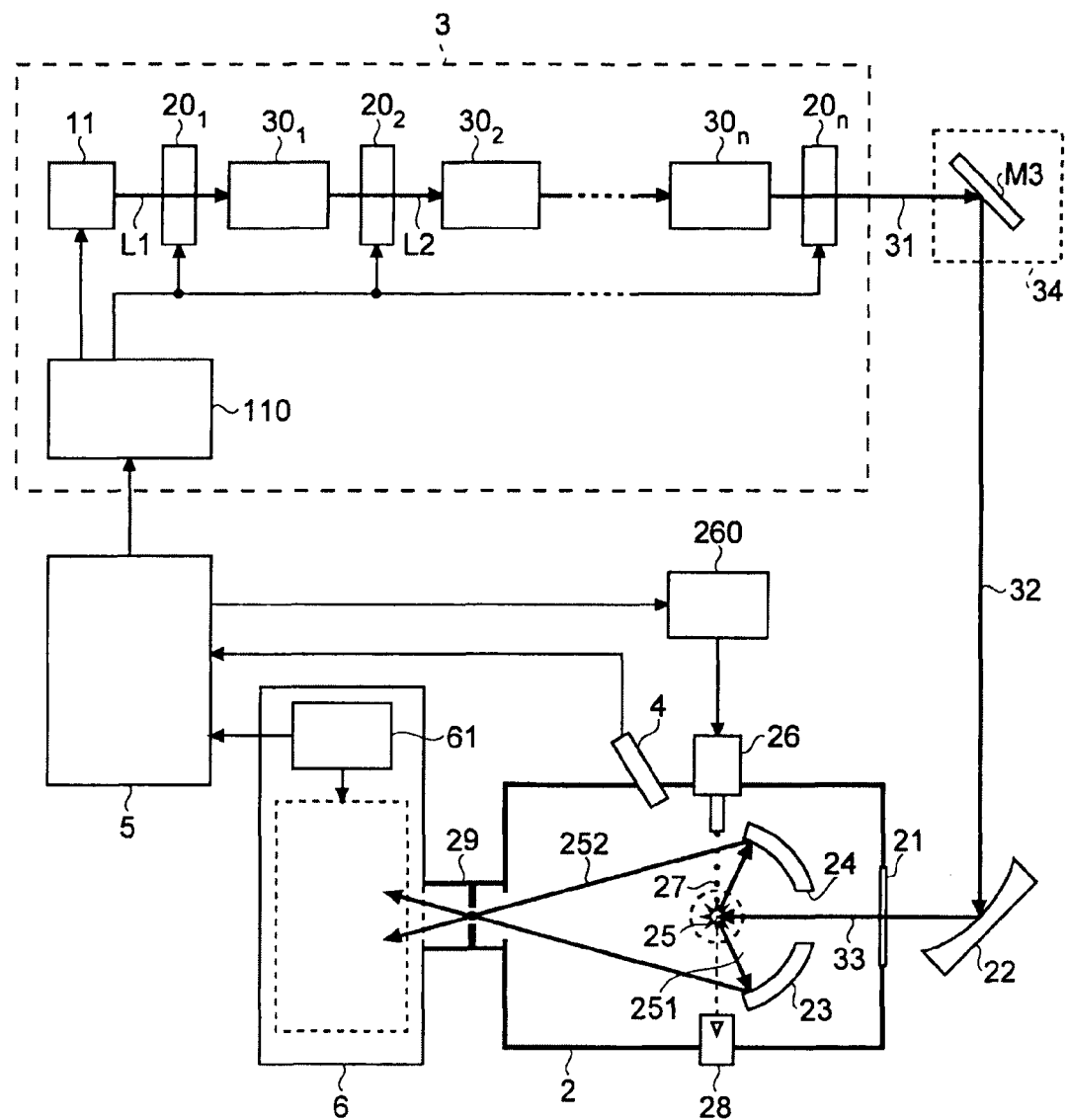
FIG. 18 schematically illustrates the configuration of an EUV light generation system according to a fifth embodiment of this disclosure.

FIG. 18 schematically illustrates the configuration of an EUV light generation system according to the fifth embodiment. Of the configuration illustrated in FIG. 1, elements not directly related to the description of the fifth embodiment are omitted in FIG. 18 and in the description to follow. Further, in the fifth embodiment, the laser apparatus 3 shown in FIG. 3 will be cited, but the embodiment is not limited thereto.

As illustrated in FIG. 18, the controller 110 may output trigger signals to the master oscillator 11 under the control of the EUV light generation controller 5. Further, the controller 110 may output to the optical shutters $20_1$ through $20_n$, shutter switching signals (switching pulse signals) for switching the optical shutters $20_1$ through $20_n$ under the control of the EUV light generation controller 5. In this way, in the laser apparatus 3, the laser beam burst output period Tb and the laser beam burst rest period Tr may be controlled by the EUV light generation controller 5.

Further, in the configuration shown in FIG. 18, a droplet controller 260 may be connected to the droplet generator 26. The droplet controller 260 may output to the droplet generator 26 droplet output signals for causing the droplets 27 to be outputted, under the control of the EUV light generation controller 5. In the fifth embodiment, the droplets 27 may be outputted on-demand from the droplet generator 26. In that case, the timing at which the droplet 27 is outputted may be controlled by the EUV light generation controller 5. However, the droplet generator 26 may be replaced with a so-called continuous jet type droplet generator.

The target sensor 4 may measure the presence, trajectory, position, and so forth, of the droplet 27. From this measurement result, the timing at which the droplet 27 arrives in the plasma generation region 25 (plasma generation region arrival timing) may be calculated or detected. The plasma generation region arrival timing may be detected by the target sensor 4 or by the EUV light generation controller 5. When the target sensor 4 is configured to detect the plasma generation region arrival timing, the target sensor 4 may output the detected plasma generation region arrival timing to the EUV light generation controller 5.

8.2 Timing Chart

Figure 19:
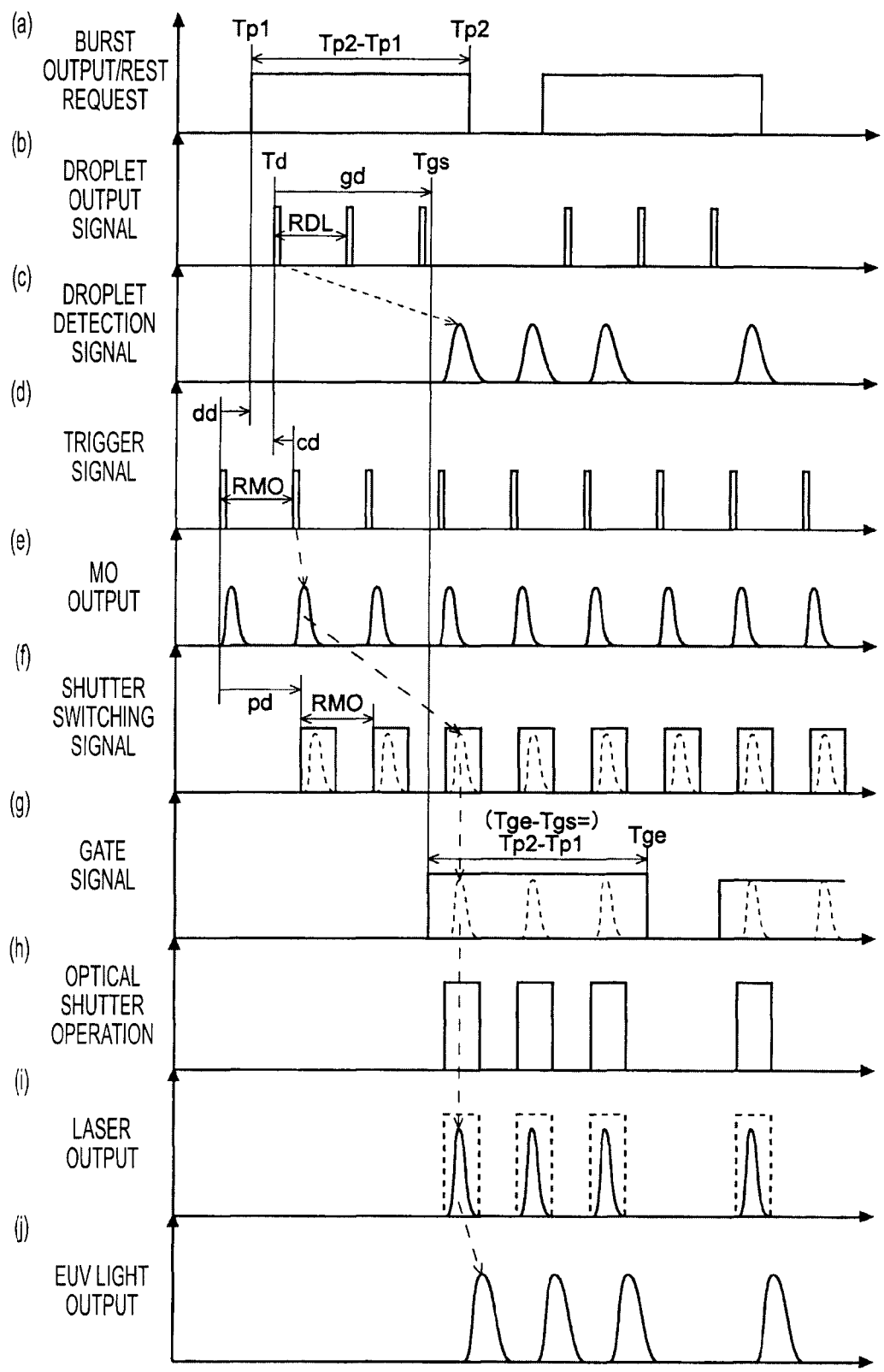
FIG. 19 is a timing chart showing an example of various signals according to the fifth embodiment.

Various signals according to the fifth embodiment will be described in detail with reference to the drawing. FIG. 19 is a timing chart showing an example of the various signals according to the fifth embodiment. As shown in FIG. 19(*a*), the burst output request may be inputted from the exposure apparatus controller 61 to the EUV light generation controller 5 between timing Tp1 and timing Tp2. The burst output request may be a gate pulse signal, for example. As shown in FIG. 19(*d*), trigger signals at a predetermined repetition rate RMO may be inputted to the master oscillator 11 from the controller 110 under the control of the EUV light generation controller 5. That is, not only during the laser beam burst output period Tb, but also during the laser beam burst rest period Tr, the trigger signals may be inputted to the master oscillator 11 from the controller 110 at the predetermined repetition rate RMO. In that case, pulse laser beams (seed beams) may be outputted continually from the master oscillator 11 at the predetermined repetition rate RMO as shown in FIG. 19(*e*). A processing delay time dd may be present from a trigger signal (FIG. 19(*d*)) immediately preceding the rise of the burst output request (FIG. 19(*a*)) to the rise (Tp1) of the burst output request.

As shown in FIG. 19(*f*), shutter switching signals at the predetermined repetition rate RMO may be inputted to the optical shutter 20 at timing delayed by a predetermined duration (optical shutter delay time pd) with respect to the trigger signals, for example. The optical shutter delay time pd for each optical shutter 20 may differ from others in accordance with the timing at which a pulse laser beam outputted from the master oscillator 11 passes through the respective optical shutters 20. As shown in FIG. 19(*g*), a gate signal (gate pulse signal) may be inputted to the optical shutter 20 for a duration corresponding to the duration (Tp2−Tp1) of the burst output request, beginning from the rise of the gate signal being delayed by a predetermined delay time (gate delay time gd) with respect to a droplet output signal (See FIG. 19 (*b*)), which is to be described later. The gate delay time gd for each optical shutter 20 may differ from others in accordance with the timing at which a pulse laser beam outputted from the master oscillator 11 passes through the respective optical shutters 20. In FIG. 19, the timing of the shutter switching signal and the timing of the gate signal for the optical shutter 20 are set to be the same for simplifying the description.

As shown in FIG. 19(*h*), the optical shutter 20 may be open while both the shutter switching signal (FIG. 19(*f*)) and the gate signal (FIG. 19(*g*)) are inputted to the optical shutter 20. In other words, the optical shutter 20 may be switched based on logical multiplication (AND) of the shutter switching signal and the gate signal. Accordingly, as shown in FIG. 19(*i*), the pulsed laser beam 31 may be outputted from the laser apparatus 3 while both the shutter switching signal and the gate signal are ON. Instead, at least one of the shutter switching signal and the gate signal may be inputted to the optical shutter 20. In that case, by having the plurality of the optical shutters 20 be in operation, the operation of the optical shutter 20 as shown in FIG. 19(*h*) may be achieved.

Meanwhile, as shown in FIG. 19(*b*), the droplet controller 260 may output the droplet input signals at a predetermined repetition rate (droplet output frequency RDL) to the droplet generator 26 for at least a predetermined period, while the burst output request is inputted to the EUV light generation controller 5, under the control of the EUV light generation controller 5. The trigger signal for the pulse laser beam L to be synchronized with the droplet output signal may be outputted at timing delayed by a predetermined delay time (droplet delay time cd). The droplet generator 26 may output the droplets 27 in accordance with the droplet output signals. When the droplet 27 is outputted, the target sensor 4 may detect the droplet 27 as shown in FIG. 19(*c*) and generate a droplet detection signal. In this description, it is assumed that the target sensor 4 detects the droplet 27 passing through the plasma generation region 25, for simplifying the description. That is, the droplet detection signal shown in FIG. 19(*c*) indicates the timing at which the droplet 27 passes through the plasma generation region 25. In that case, the timing of the droplet detection signal may substantially coincides with the timing at which the pulsed laser beam 31 outputted from the laser apparatus 3 (FIG. 19(*i*)) is focused, as the pulsed laser beam 33, in the plasma generation region 25. This indicates that the pulsed laser beam 33 and the droplets 27 are substantially synchronized in the plasma generation region 25. When the pulsed laser beam 33 and the droplets 27 are synchronized, the droplets 27 may be irradiated with the pulsed laser beam 33 in the plasma generation region 25. As a result, as shown in FIG. 19(j), the EUV 252 may be outputted from the EUV light generation system.

8.3 Flowchart

Figure 20:
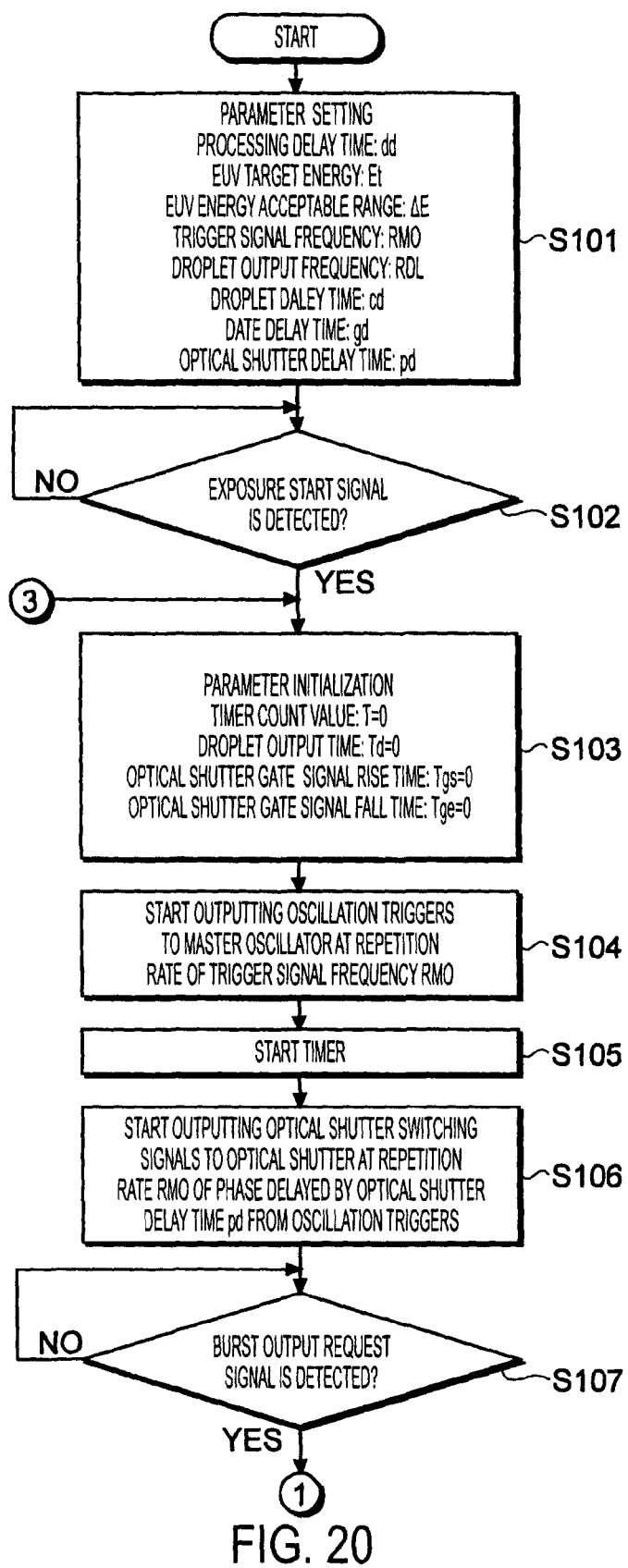
FIGS. 20 through 22 show a flowchart showing an example of synchronization control operation according to the fifth embodiment.
Figure 21:
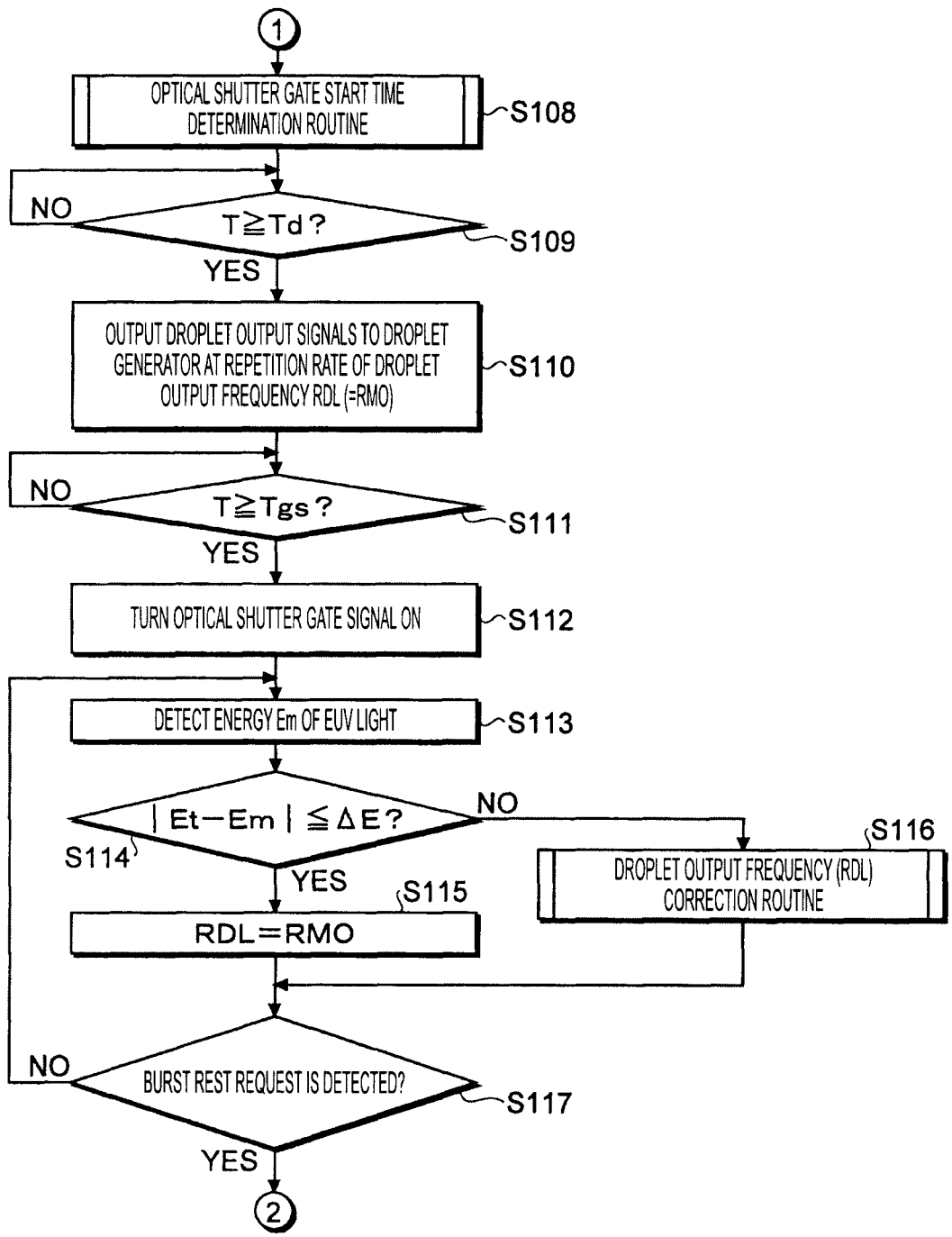
Figure 22:
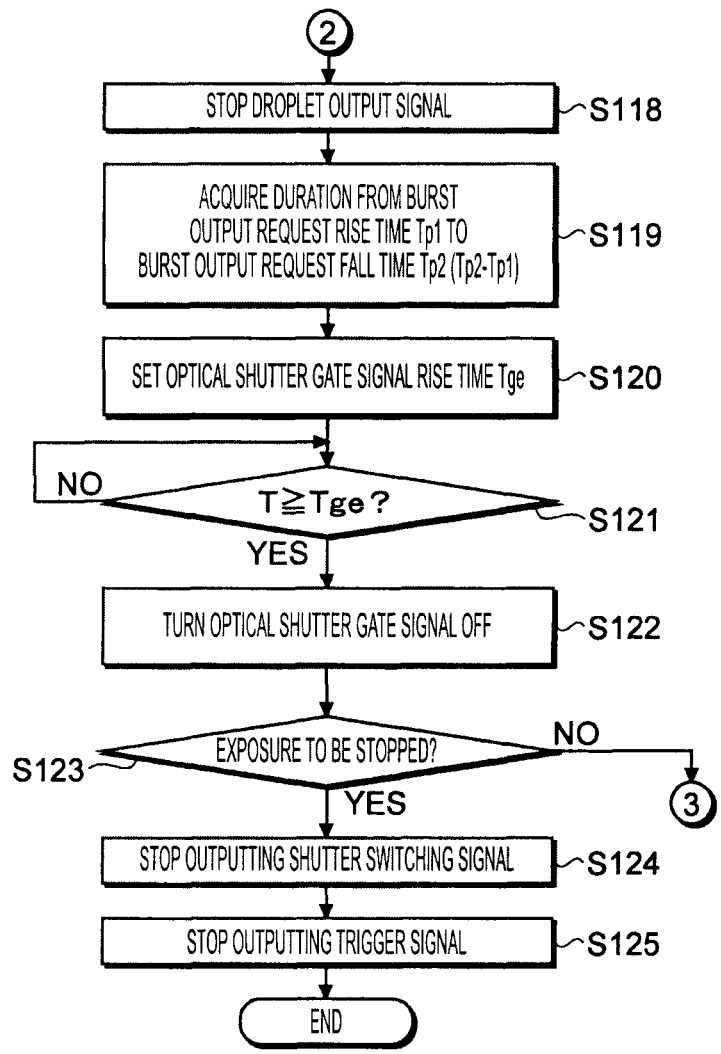

The control operation for synchronizing the pulsed laser beam with the droplets will be described in detail with reference to the drawings. FIGS. 20 through 22 are flowcharts showing an example of the synchronization control operation according to the fifth embodiment. Here, the description will be given with a focus on the EUV light generation controller 5 for controlling various controllers.

As shown in FIG. 20, the EUV light generation controller 5 may first set various parameters (Step S101). The various parameters may include, for example, the processing delay time dd, EUV target energy Et, an EUV energy acceptable range ΔE, the trigger signal frequency RMO, the droplet output frequency RDL, the droplet delay time cd, the gate delay time gd, the optical shutter delay time pd, and so forth. These parameters may be set to their initial values. Alternatively, values to be set to these parameters may be given by the exposure apparatus controller 61, or may be read out from a memory (not shown).

Then, the EUV light generation controller 5 may wait until an exposure start signal is inputted from the exposure apparatus controller 61 notifying the start of the exposure operation in the exposure apparatus, for example (Step S102; NO). When the EUV light generation controller 5 detects the input of the exposure start signal (Step S102; YES), the EUV light generation controller 5 may initialize certain parameters (Step S103). These parameters may include a count value (timer count value) T counted by a timer (not shown), output timing of the droplet output signal (droplet output time) Td, rise timing of the gate signal (gate signal rise time) Tgs, fall timing of the gate signal (gate signal fall time) Tge, and so forth. These values may be set, for example, to T=0, Td=0, Tgs=0, and Tge=0, respectively.

Subsequently, the EUV light generation controller 5 may control the controller 110 to start outputting the trigger signals to the master oscillator 11 (Step S104). The repetition rate of the trigger signals here may be the same as the trigger signal frequency RMO set in Step S101.

Then, the EUV light generation controller 5 may start the timer (Step S105). Thereafter, the EUV light generation controller 5 may control the controller 110 to start outputting the shutter switching signals to the optical shutter 20 at a phase delayed by the optical shutter delay time pd with respect to the trigger signal (Step S106). The repetition rate of the shutter switching signals here may be the same as the trigger signal frequency. The duration in which the optical shutter 20 is open may be constant. Further, this duration may be longer than the duration (pulse width) of the pulse laser beam.

In this way, when the preparation for generating the EUV light is complete, the EUV light generation controller 5 may wait until the burst output request is inputted from the exposure apparatus controller 61 (Step S107; NO). When the EUV light generation controller 5 detects the input of the burst output request (Step S107; YES), the EUV light generation controller 5 may execute an optical shutter gate start time determination routine, as shown in FIG. 21 (Step S108). When the rise time of the gate signal (FIG. 19(g)) is determined by the optical shutter gate start time determination routine, the EUV light generation controller 5 may wait until the timer count value T reaches the droplet output time Td (Step S109; NO). When the timer count value T reaches the droplet output time Td (Step S109; YES), the EUV light generation controller 5 may control the droplet controller 260 to output the droplet output signals (FIG. 19(b)) to the droplet generator 26 (Step S110). Here, the droplet output signals may be outputted at the repetition rate of the droplet output frequency RDL (=RMO).

Subsequently, the EUV light generation controller 5 may wait until the timer count value T reaches the gate signal rise time Tgs (Step S11; NO). When the timer count value T reaches the gate signal rise time Tgs (Step S111; YES), the EUV light generation controller 5 may turn the gate signal ON (Step S112). With this, the pulsed laser beam 31 may be outputted from the laser apparatus 3. As a result, the droplet 27 passing through the plasma generation region 25 may be irradiated by the pulsed laser beam 33, whereby the EUV light 252 may be generated.

Then, the EUV light generation controller 5 may acquire energy Em of the EUV light 252 based on the quantity of the EUV light 252 detected by an energy sensor (not shown) (Step S113). Subsequently, the EUV light generation controller 5 may determine whether a difference between the energy Em and the EUV target energy Et (|Et−Em|) falls within the EUV energy acceptable range ΔE (Step S114). When the difference (|Et−Em|) falls within the EUV energy acceptable range ΔE (Step S114; YES), the EUV light generation controller 5 may set the trigger signal frequency RMO to the droplet output frequency RDL (Step S115). Thereafter, the EUV light generation controller 5 may proceed to Step S117. On the other hand, when the difference (|Et−Em|) does not fall within the EUV energy acceptable range ΔE (Step S114; NO), the EUV light generation controller 5 may execute a droplet output frequency (RDL) correction routine for correcting the output timing of the droplet output signals (Step S116). Thereafter, the EUV light generation controller 5 may proceed to Step S117.

In Step S117, the EUV light generation controller 5 may determine whether the EUV light generation controller 5 has detected the input of the burst rest request from the exposure apparatus controller 61. When the burst rest request has not been inputted (Step S117; NO), the EUV light generation controller 5 may return to Step S113 and repeat the subsequent steps. On the other hand, when the burst rest request has been inputted (Step S117; YES), the EUV light generation controller 5 may proceed to Step S118 shown in FIG. 22, and cause the droplet controller 260 to stop outputting the droplet output signals.

Thereafter, the EUV light generation controller 5 may acquire a duration (Tp2−Tp1) from the rise time Tp1 of the burst output request to the fall time Tp2 of the burst output request (Step S119). Then, the EUV light generation controller 5 may set the gate signal fall time Tge by adding the acquired duration (Tp2−Tp1) to the time Tgs (Step S120).

Then, the EUV light generation controller 5 may wait until the timer count value T reaches the gate signal fall time Tge (Step S121; NO). When the timer count value T reaches the gate signal fall time Tge (Step S121; YES), the EUV light generation controller 5 may control the controller 110 to turn the gate signals OFF (Step S122).

Thereafter, the EUV light generation controller 5 may determine whether the stop of the exposure has been notified from the exposure apparatus controller 61, for example (Step S123). When the stop of the exposure has been notified (Step S123; YES), the EUV light generation controller 5 may control the controller 110 to stop outputting the shutter switching signals (Step S124). Further, the EUV light generation controller 5 may stop outputting the trigger signals (Step S125).

Subsequently, the EUV light generation controller 5 may terminate the processing. On the other hand, when the stop of the exposure has not been notified (Step S123; NO), the EUV light generation controller 5 may return to Step S103 and repeat the subsequent steps.

Figure 23:
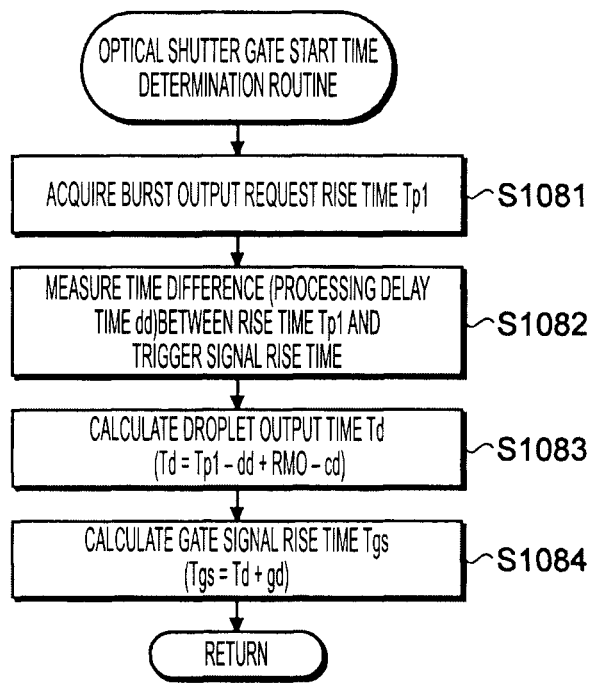
FIG. 23 shows an example of an optical shutter gate start time determination routine in Step S108 of FIG. 21.

The optical shutter gate start time determination routine shown in Step S108 will be described with reference to FIG. 23. As shown in FIG. 23, in the optical shutter gate start time determination routine, the EUV light generation controller 5 may acquire the rise time Tp1 of the burst output request inputted from the exposure apparatus controller 61 (Step S1081). Then, the EUV light generation controller 5 may measure a temporal difference (processing delay time dd) between the rise time Tp1 and the rise time of the trigger signal (Step S1082). Subsequently, the EUV light generation controller 5 may calculate the droplet output time Td from the rise time Tp1, the processing delay time dd, the trigger signal frequency RMO, and the droplet delay time cd (Step S1083). Expression (1) below may be used to calculate the droplet output time Td.

$$Td = Tp1 - dd + RMO - cd \quad (1)$$

Thereafter, the EUV light generation controller 5 may calculate the gate signal rise time Tgs from the droplet output time Td and the gate delay time gd (Step S1084). Expression (2) below may be used to calculate the gate signal rise time Tgs. Subsequently, the EUV light generation controller 5 may return to Step S108 shown in FIG. 21.

$$Tgs = Td + gd \quad (2)$$

Figure 24:
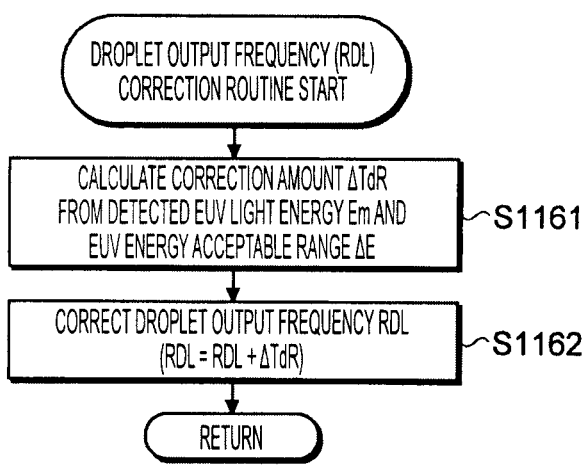
FIG. 24 shows an example of a droplet output frequency (RDL) correction routine in Step S116 of FIG. 21.

The droplet output frequency (RDL) correction routine shown in Step S116 will be described with reference to FIG. 24. As shown in FIG. 24, in the droplet output frequency (RDL) correction routine, the EUV light generation controller 5 may calculate a correction amount $\Delta TdR$ for the output timing of the droplet output signal (Step S1161). The correction amount $\Delta TdR$ may be calculated from the energy Em of the EUV light detected in Step S113 and the EUV energy acceptable range $\Delta E$ set in Step S101. Then, the EUV light generation controller 5 may calculate a corrected droplet output frequency RDL from the calculated correction amount $\Delta TdR$ and the current droplet output frequency RDL (Step S1162). Expression (3) below may be used to calculate the corrected droplet output frequency RDL. Subsequently, the EUV light generation controller 5 may return to Step S116 shown in FIG. 21.

$$RDL = RDL + \Delta TdR \quad (3)$$

A time lag between the timing of the pulsed laser beam 33 and the output timing of the droplet output signal may be either in a positive or negative direction. Thus, the EUV light generation controller 5 may determine whether the absolute value (|Et−Em|) of the difference between the energy Em previously calculated in Step S114 and the EUV target energy Et has become larger than the absolute value (|Et−Em|) of the difference calculated in Step S114 this time. When the absolute value (|Et−Em|) of the difference calculated previously in Step S114 is larger than the absolute value (|Et−Emf|) of the difference calculated later in Step S114, the EUV light generation controller 5 may reverse the sign of the correction amount $\Delta TdR$ in Step S1162.

8.4 Effect

With the above configuration and operation, the output timing of the droplets 27 may be adjusted so as to be synchronized with the pulsed laser beam 33 passing through the plasma generation region 25. Further, since the pulsed laser beam 33 and the droplets 27 are synchronized in the plasma generation region 25, droplets 27 that may not be irradiated with the pulsed laser beam 33 may be prevented from being outputted. As a result, consumption of the target material (such as Sn) may be reduced. Further, since a burst of the pulsed laser beam 31 may be implemented using the optical shutter 20, the master oscillator may be allowed to operate continually at a predetermined repetition rate. As a result, the energy of the pulse laser beams L1 and L2 may be stabilized.

In the above description, the droplets 27 are synchronized with the pulsed laser beam 33, but this disclosure is not limited thereto. For example, the output timing of the pulsed laser beam 31 may be adjusted so that the pulsed laser beam 33 is synchronized with the droplets 27 passing through the plasma generation region 25, for example. Further, the burst output request and the burst rest request may be inputted at given timing without being synchronized with the trigger signals. In that case, the pulsed laser beam 31 can be outputted while the gate signal is ON.

9. Synchronization of Pulsed Laser Beam and Droplets Using Timing Sensor (Sixth Embodiment)

The timing of the pulsed laser beam 33 and the timing of the droplets 27 passing through the plasma generation region 25 may be synchronized using a timing sensor for detecting timing at which the pulse laser beam L1 or L2 passes a given point on the beam path. Hereinafter, this embodiment will be described in detail with reference to the drawings.

9.1 Configuration

Figure 25:
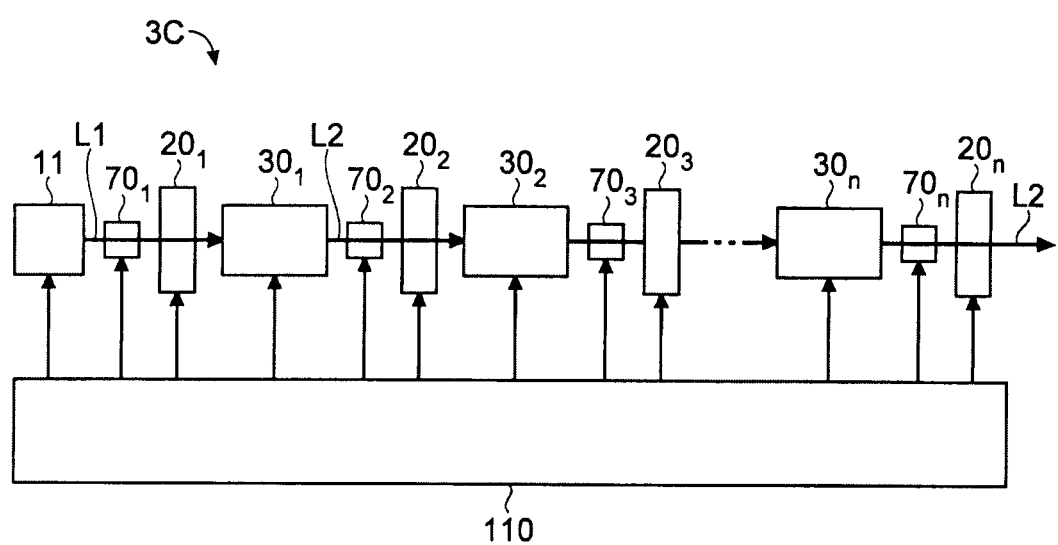
FIG. 25 schematically illustrates the configuration of a laser apparatus according to a sixth embodiment of this disclosure.

FIG. 25 schematically illustrates the configuration of a laser apparatus according to a sixth embodiment. As illustrated in FIG. 25, in the sixth embodiment, timing sensors $70_1$ through $70_n$ may be disposed at the input sides of the optical shutters $20_1$ through $20_n$, respectively. The timing sensors $70_1$ through $70_n$ may detect the passing timing of the pulse laser beam L1 or L2. Other configurations may be similar to those of the laser apparatus according to any of the above embodiments.

9.2 Timing Chart

Figure 26:
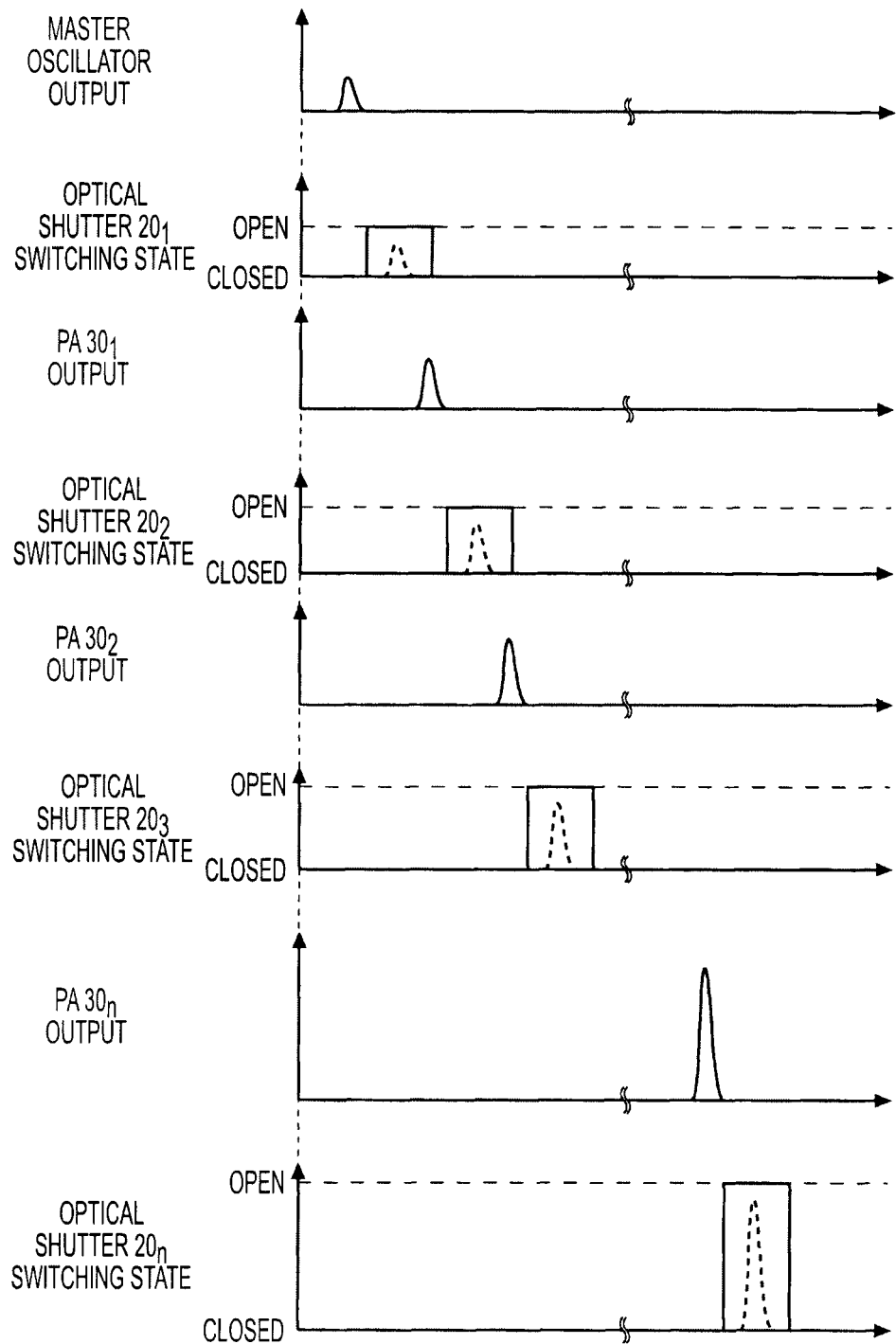
FIG. 26 shows an example of a timing chart of a pulse laser beam and switching states of the optical shutters in the laser apparatus shown in FIG. 25.

FIG. 26 shows a timing chart of a pulse laser beam and a switching state of each optical shutter in the laser apparatus shown in FIG. 25. As illustrated in FIG. 26, in the sixth embodiment, the optical shutters $20_1$ through $20_n$ may be switched respectively in synchronization with timing at which the pulse laser beam L1 or L2 passes through the respective optical shutters $20_1$ through $20_n$. This may be achieved based on the passing timing of the pulse laser beam L1 or L2 detected by the timing sensors $70_1$ through $70_n$, for example. For example, when the timing sensors $70_1$ through $70_n$ detect the pulse laser beam L1 or L2, the optical shutters $20_1$ through $20_n$ may be opened at timing prior to the pulse laser beam L1 or L2 passing through the optical shutters $20_1$ through $20_n$. Thereafter, when the timing sensors $70_1$ through $70_n$ detect the pulse laser beam L1 or L2, the optical shutters $20_1$ through $20_n$ may be closed at timing following the pulse laser beam L1 or L2 passing through the optical shutters $20_1$ through $20_g$. Here, the duration in which the optical shutter 20 is being open may preferably be longer than the duration (pulse width) of the pulse laser beam L1 or L2.

9.3 Effect

With the above configuration and operation, a laser beam returning from downstream, such as a laser beam reflected by the droplet 27, may be blocked effectively. Further, the self-oscillation beam may be suppressed effectively.

In the sixth embodiment, the case where the timing sensors $70_1$ through $70_n$ are disposed at the input sides of the respective optical shutters $20_1$ through $20_n$ is discussed, but this disclosure is not limited thereto. For example, a timing sensor may be disposed at the input side of at least one optical shutter 20 of the optical shutters $20_1$ through $20_n$. In that case, the timing sensor may preferably be disposed upstream of the path on which the pulse laser beam travels. Further, the optical shutter 20, to which a timing sensor is not provided at the input side thereof, may be switched in synchronization with projected passing timing of the pulse laser beam L1 or L2. The projected passing timing is obtained from the timing detected by the timing sensor.

Further, excitation voltage may be applied to the amplifier 30 so that the amplifier amplifies the pulse laser beam L1 or L2 in accordance with the passing timing of the pulse laser beam L1 or L2 detected or estimated using the timing sensor.

9.4 Configuration Examples of Timing Sensor

Configuration examples of the timing sensors $70_1$ through $70_n$ according to the sixth embodiment will be described in detail with reference to the drawings.

9.4.1 Configuration Example 1

Figure 27:
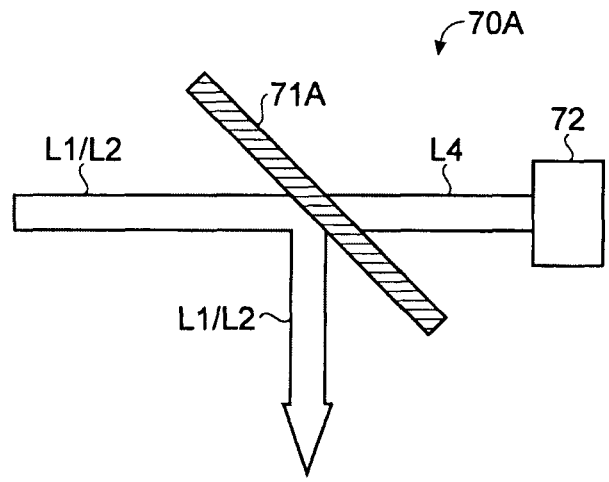
FIG. 27 schematically illustrates the configuration of a timing sensor according to a first example of the sixth embodiment.

FIG. 27 schematically illustrates the configuration of a timing sensor according to a first configuration example of the sixth embodiment. As illustrated in FIG. 27, a timing sensor 70A may include a mirror 71A and an optical sensor 72. The mirror 71A may reflect almost entirety of the pulse laser beam L1 or L2 incident thereon. Further, the mirror 71A may transmit a part of the incident beam as a leak beam L4. The optical sensor 72 may detect the leak beam L4 transmitted through the mirror 71A. With this configuration, the timing sensor 70A may detect the timing at which the pulse laser beam L1 or L2 passes through the timing sensor 70A.

9.4.2 Configuration Example 2

Figure 28:
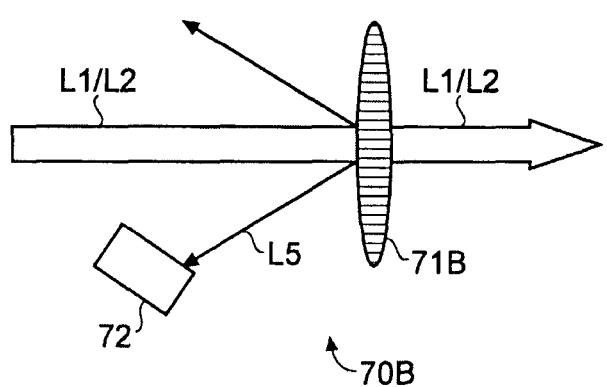
FIG. 28 schematically illustrates the configuration of a timing sensor according to a second example of the sixth embodiment.

FIG. 28 schematically illustrates the configuration of a timing sensor according to a second configuration example of the sixth embodiment. As illustrated in FIG. 28, a timing sensor 70B may include an optical element 71B and the optical sensor 72. The optical element 71B may be a lens, a window, or the like. The pulse laser beam L1 or L2 may be incident on the optical element 71B. The optical sensor 72 may detect a scattered beam L5 of the pulse laser beam L1 or L2 reflected by the optical element 71B. With this configuration, the timing sensor 70B may detect the timing at which the pulse laser beam L1 or L2 passes through the timing sensor 70B.

9.4.3 Configuration Example 3

Figure 29:
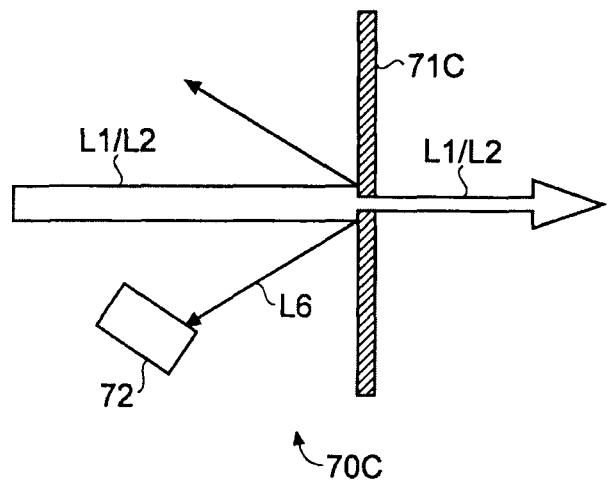
FIG. 29 schematically illustrates the configuration of a timing sensor according to a third example of the sixth embodiment.

FIG. 29 schematically illustrates the configuration of a timing sensor according to a third configuration example of the sixth embodiment. As illustrated in FIG. 29, a timing sensor 70C may include a spatial filter 71C and the optical sensor 72. The spatial filter 71C may have an aperture formed therein. The pulse laser beam L1 or L2 may be incident on the spatial filter 71C. The optical sensor 72 may detect a reflected beam L6 of the pulse laser beam L1 or L2 passing through the spatial filter 71C. With this configuration, the timing sensor 70C may detect the timing at which the pulse laser beam L1 or L2 passes through the timing sensor 70C.

9.4.4 Configuration Example 4

Figure 30:
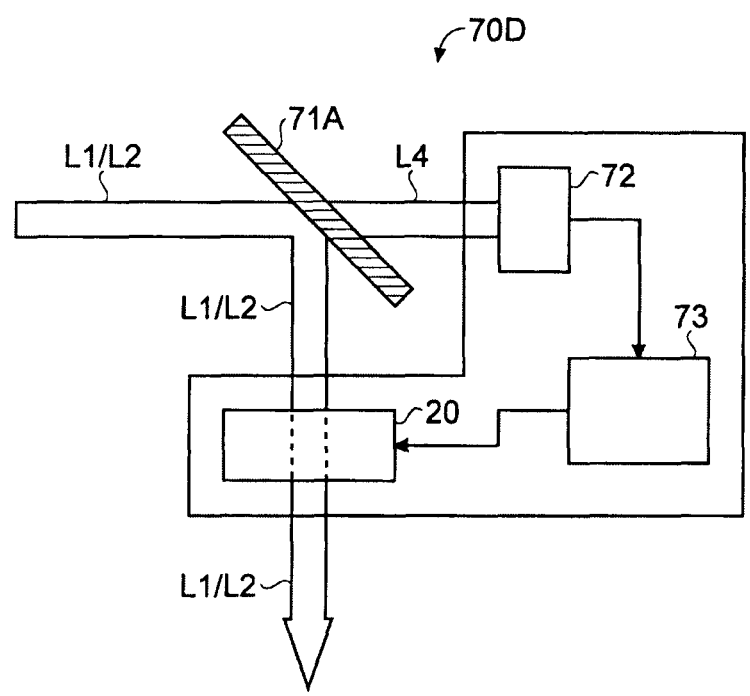
FIG. 30 schematically illustrates the configuration of a timing sensor according to a fourth example of the sixth embodiment.

Further, a timing sensor may comprise an optical shutter and an optical shutter controller. The optical shutter may either transmit or block the pulse laser beam L1 or L2. The optical shutter controller may control the switching of the optical shutter. FIG. 30 schematically illustrates the configuration of a timing sensor according to a fourth configuration example of the sixth embodiment. In the fourth configuration example, the timing sensor 70A (See FIG. 27) according to the first configuration example will be cited, but this disclosure is not limited thereto. As illustrated in FIG. 30, a timing sensor 70D may include the mirror 71A, the optical sensor 72, the optical shutter 20, and an optical shutter controller 73. The optical shutter 20 may be disposed on a beam path of the pulse laser beam L1 or L2 reflected by the mirror 71A. The detection result of the leak beam L4 by the optical sensor 72 may be inputted to the optical shutter controller 73. The optical shutter controller 73 may switch the optical shutter 20 based on the detection timing of the leak beam L4 by the optical sensor 72. With this configuration, the timing sensor 70D may be configured to actuate the optical shutter 20 independently without being controlled by the EUV light generation controller 5 or by the controller 110, for example.

9.5 Optical Delay Circuit

The pulse width of the pulse laser beams L1 and L2 may be approximately 10 to 50 ns, for example. In that case, an optical length of a space in which the pulse laser beam L1 or L2 is present may be approximately 3 to 17 meters. Accordingly, when the optical shutter 20 is provided in plurality in the laser apparatus 3, for example, an optical distance between two optical shutters 20 may preferably be greater than the optical length of the space in which the pulse laser beam L1 or L2 is present. Setting the optical distance between the two optical shutters 20 to be greater than the stated optical length may make it possible to prevent two adjacent optical shutters 20 from being open at the same time. As a result, the returning laser beam regressively traveling the beam path or the self-oscillation beam may be reduced.

Figure 31:
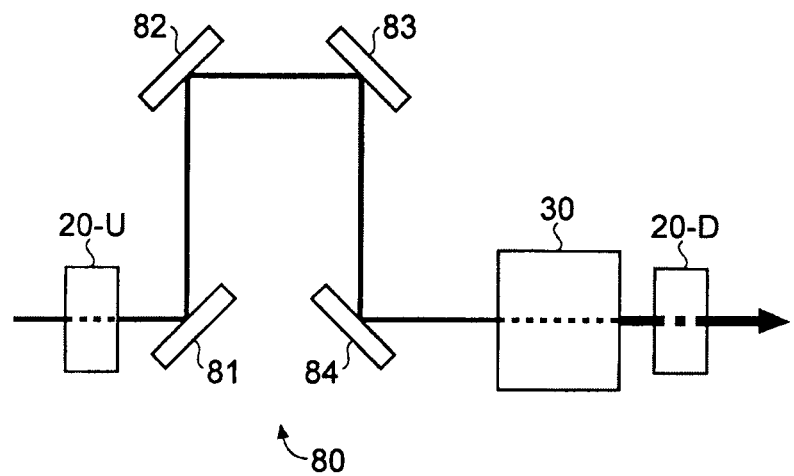
FIG. 31 schematically illustrates the configuration of an optical delay circuit according to the sixth embodiment.

FIG. 31 schematically illustrates the configuration of an optical delay circuit according to the sixth embodiment. As illustrated in FIG. 31, an optical delay circuit 80 may include high-reflection mirrors 81 through 84 for bending the beam path of the pulse laser beam L1 or L2, for example. However, without being limited thereto, any modifications can be made. In that case, it is preferable that the optical length of the pulse laser beam L1 or L2 is made sufficiently long.

Figure 32:
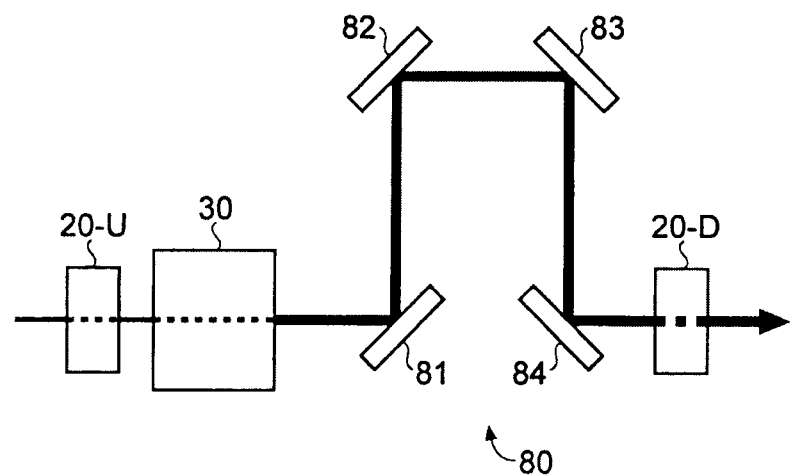
FIG. 32 schematically illustrates the configuration of another optical delay circuit according to the sixth embodiment.

The optical delay circuit 80 may be disposed between an upstream side optical shutter 20-U and the amplifier 30 provided at the input side of a downstream side optical shutter 20-D, for example, as illustrated in FIG. 31. Alternatively, the optical delay circuit 80 may be disposed between the amplifier 30 provided at the output side of the upstream side optical shutter 20-U and the downstream side optical shutter 20-D, for example, as illustrated in FIG. 32.

10. Synchronization of Pulsed Laser Beam and Droplets with Droplet as Reference (Seventh Embodiment)

As for the timing at which the droplet 27 is irradiated by the pulsed laser beam 33 in the plasma generation region 25, the timing at which the pulsed laser beam 31 is outputted may be synchronized with the timing of the droplets 27. Hereinafter, this embodiment will be described in detail with reference to the drawings.

10.1 Configuration

Figure 33:
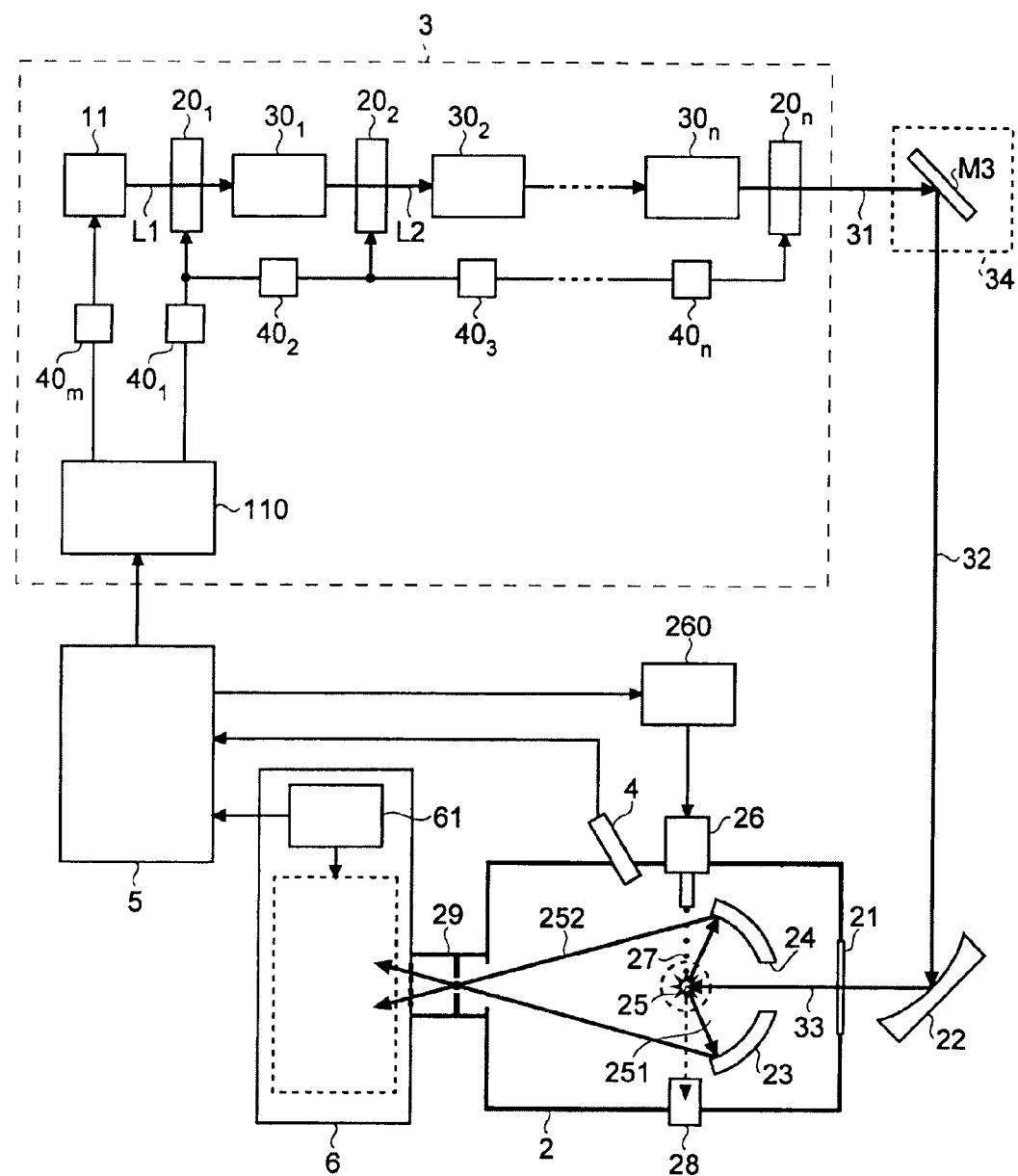
FIG. 33 schematically illustrates the configuration of an EUV light generation system according to a seventh embodiment of this disclosure.

FIG. 33 schematically illustrates the configuration of an EUV light generation system according to a seventh embodiment. Of the configuration illustrated in FIG. 1, elements not directly related to the description of the seventh embodiment are omitted in FIG. 33 and in the description to follow. Further, in the description to follow, the laser apparatus 3 shown in FIG. 3 will be cited, but this embodiment is not limited thereto.

As illustrated in FIG. 33, the EUV light generation system according to the seventh embodiment may be similar to the EUV light generation system shown in FIG. 18. However, in the EUV light generation system according to the seventh embodiment, a delay circuit $40_m$ for delaying the trigger signals by a predetermined time may be disposed on a line through which the trigger signals are inputted to the master oscillator 11 from the controller 110. Further, delay circuits $40_1$ through $40_n$ for delaying the shutter switching signals or the gate signals respectively may be provided on a line through which the shutter switching signals or the gate signals are inputted to the respective optical shutters $20_1$ through $20_n$ from the controller 110.

In the above configuration, the target sensor 4 may detect the timing at which the droplet 27 passes a given point on its trajectory. The target sensor 4 may output the droplet detection signal indicating the detected passing timing to the EUV light generation controller 5. The EUV light generation controller 5 may output various instructions to the controller 110 or to the droplet controller 260 based on the droplet detection signal inputted from the target sensor 4.

10.2 Operation

The operation of the EUV light generation system according to the seventh embodiment will be described in detail with reference to the drawings.

10.2.1 Timing Chart

Figure 34:
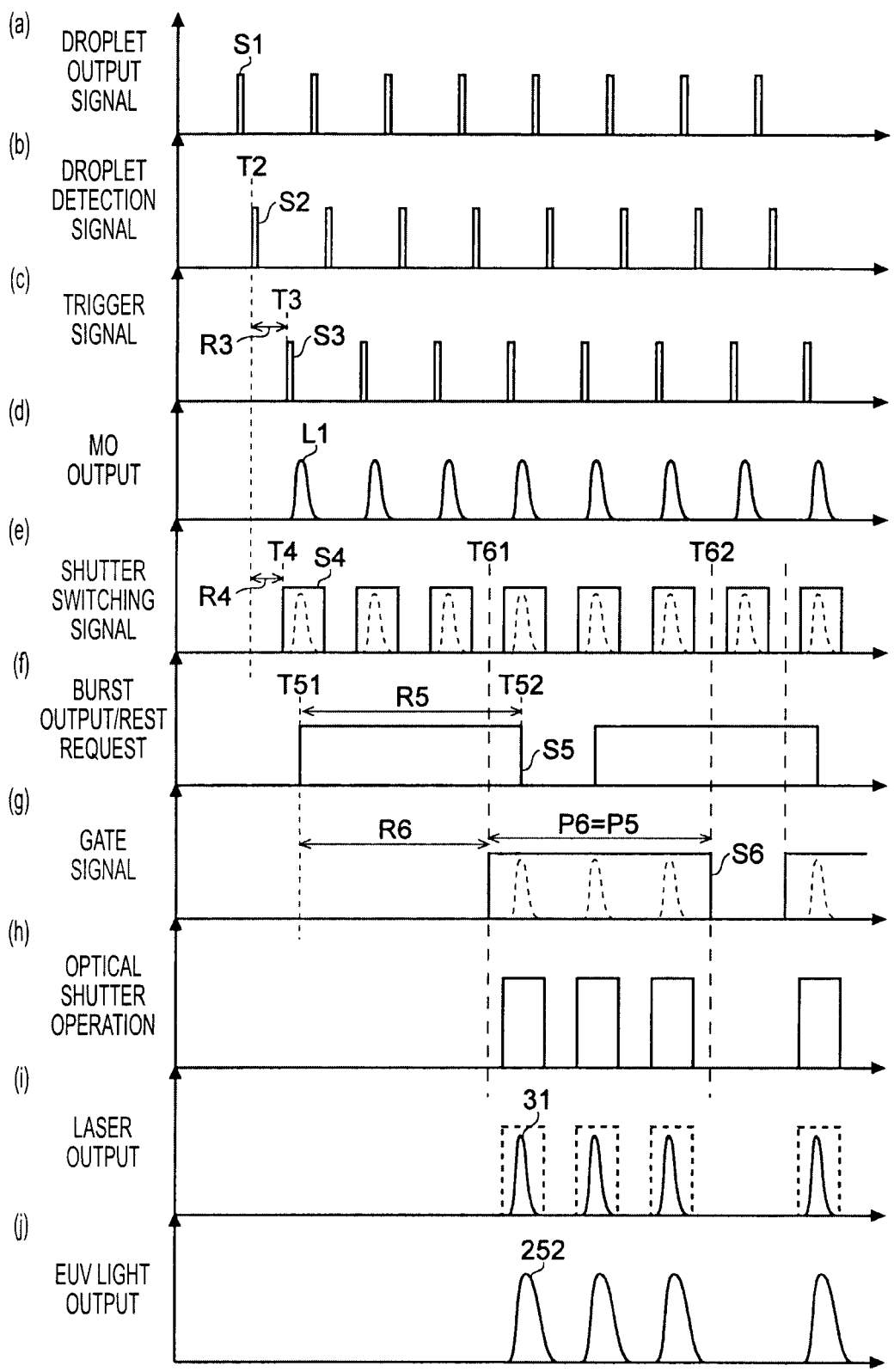
FIG. 34 is a timing chart showing an example of various signals according to the seventh embodiment.

FIG. 34 is a timing chart showing various signals according to the seventh embodiment. The EUV light generation controller 5 may first output a droplet output instruction to the droplet controller 260. The droplet controller 260 may respond to the droplet output instruction and output droplet output signals S1 to the droplet generator 26, as shown in FIG. 34(a). The droplet output signals S1 may be outputted continually at a predetermined repetition rate. With this, the target material may be outputted from the droplet generator 26 in the form of the droplets continually at the predetermined repetition rate. The target sensor 4 may detect the droplet 27 passing through a given point on its trajectory. The target sensor 4 may output the detection result as a droplet detection signal S2, as shown in FIG. 34(b). The droplet detection signal S2 may be inputted to the EUV light generation controller 5.

When the droplet detection signal S2 is inputted, the EUV light generation controller 5 may output an oscillation instruction to the controller 110. The controller 110 may respond to the oscillation instruction, and output a trigger signal S3 to the master oscillator 11, as shown in FIG. 34(c). The trigger signal S3 may be outputted in synchronization with the droplet detection signal S2. With this, pulsed laser beams L may be outputted from the master oscillator 11 in synchronization with the droplet detection signals S2, as shown in FIG. 34(d). The trigger signals S3 may be inputted to the master oscillator 11 at timing T3 that is delayed by a predetermined time (delay time R3) with respect to timing T2 of the droplet detection signals S2. The delay time R3 may be adjusted by the delay circuit $40_m$, for example. The delay time R3 by the delay circuit $40_m$ may be set by the controller 110.

Further, the controller 110 may respond to the oscillation instruction, and output shutter switching signals S4 to the respective optical shutters $20_1$ through $20_n$, as shown in FIG. 34(e). The shutter switching signals S4 may be outputted in synchronization with the droplet detection signals S2. The shutter switching signals S4 may be inputted to the optical shutters $20_1$ through $20_n$, respectively, at timing T4 that is delayed by a predetermined time (delay time R4) with respect to the timing T2 of the droplet detection signals S2. The delay time R4 of the shutter switching signals S4 with respect to the respective optical shutters $20_1$ through $20_n$ may be adjusted for the respective delay circuits $40_1$ through $40_n$, for example. The delay time R4 by the delay circuits $40_1$ through $40_n$ may be set by the controller 110.

Further, as shown in the rise of S5 in FIG. 34(f), the burst output request of the EUV light 252 may be inputted to the EUV light generation controller 5 from an exposure apparatus, such as the exposure apparatus controller 61. The EUV light generation controller 5 may input the burst output request to the controller 110. The controller 110, responsive to the burst output request, may turn a gate signal S6 ON at timing T61 that is delayed by a delay time R6 with respect to input timing T51 of the burst output request, as shown in FIG. 34(g). The gate signal S6 may be inputted to at least one or all of the optical shutters $20_1$ through $20_g$. The controller 110 may adjust the delay time R6 and the timing T61 such that the rise timing T61 of the gate signal S6 may reside outside the output duration of the shutter switching signals S4.

Further, as shown in the fall of S5 in FIG. 34(f), the burst rest request of the EUV light 252 may be inputted to the EUV light generation controller 5 from an exposure apparatus, such as the exposure apparatus controller 61. The EUV light generation controller 5 may input the burst rest request to the controller 110. The controller 110 may measure a time length P5 from the input of the burst output request to the input of the burst rest request, that is, a time length from the rise timing T51 of the burst output request to fall timing T52 of the burst output request. The controller 110 may turn the gate signal S6 OFF at timing T62, at which a time length P6 is equal to the time length P5. The controller 110 may adjust the timing T62 such that the fall timing T62 of the gate signal S6 may reside outside the output duration of the shutter switching signals S4.

When the shutter switching signals S4 and the gate signal S6 are inputted to the optical shutters $20_1$ through $20_n$, the switching of the optical shutters $20_1$ through $20_n$ may be based on the logical multiplication of the shutter switching signals S4 and the gate signal S6, as shown in FIG. 34(h). With this, the pulsed laser beam 31 may be outputted from the laser apparatus 3 while the logical multiplication of the shutter switching signals S4 and the gate signal S6 is satisfied, as shown in FIG. 34(i). As a result, the pulsed EUV light 252 may be outputted from the EUV light generation system for the duration corresponding to the duration in which the logical multiplication of the shutter switching signals S4 and the gate signal S6 is satisfied, as shown in FIG. 34(j). Here, in place of the shutter switching signals S4 and the gate signal S6, a signal obtained as the logical multiplication of the shutter switching signals S4 and the gate signal S6 may be inputted to at least one or all of the optical shutters $20_1$ through $20_n$.

10.2.2 Flowchart

Figure 35:
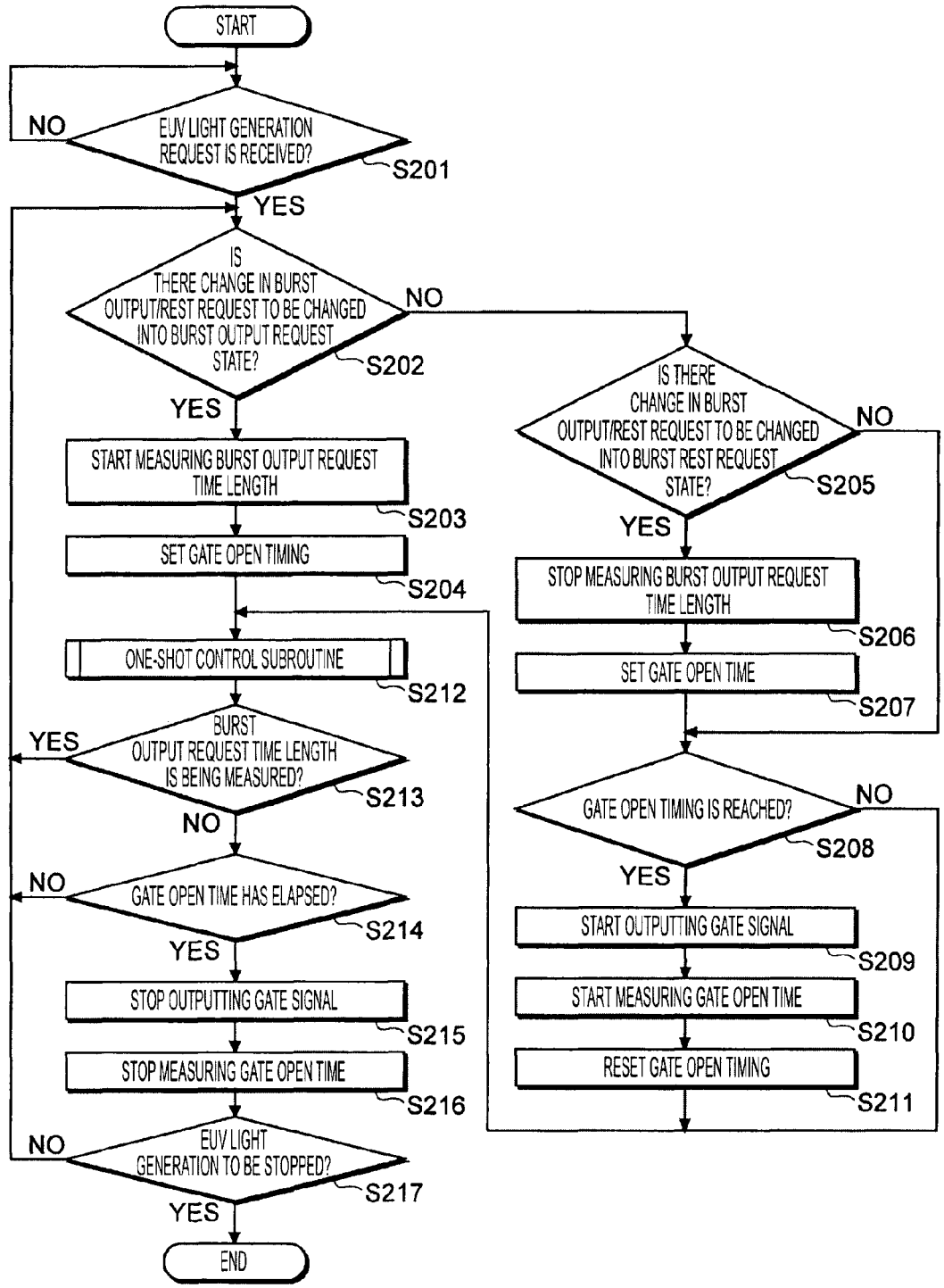
FIG. 35 is a flowchart showing an example of the operation for generating EUV light according to the seventh embodiment.

FIG. 35 is a flowchart showing an example of the EUV light generation operation according to the seventh embodiment. Here, the description will be given with a focus on the EUV light generation controller 5 for controlling various controllers.

As illustrated in FIG. 35, the EUV light generation controller 5 may wait for the EUV light generation request to be inputted from an external apparatus, such at the exposure apparatus controller 61 (Step S201; NO). When the EUV light generation request is inputted (Step S201; YES), the EUV light generation controller 5 may execute the following operation as an idling operation until a burst output/rest request is turned into a burst output request state. That is, the EUV light generation controller 5 may determine whether there has been a change in the burst output/rest request so as to be turned into the burst output request state (Step S202). In an idling operation stage, the EUV light generation controller 5 does not detect the change in the burst output/rest request. Accordingly, the determination result in Step S202 may be "NO." In that case (Step S202; NO), the EUV light generation controller 5 may then determine whether there has been a change in the burst output/rest request so as to be turned into the burst rest request state (Step S205). In the idling operation stage, the EUV light generation controller 5 does not detect the change in the burst output/rest request. Accordingly, the determination result in Step S205 may be "NO." In that case (Step S205; NO), the EUV light generation controller 5 may determine whether the gate open timing (T61), at which the gate signal S6 is turned ON, has been reached (Step S208). In the idling operation stage, the gate open timing has not been set. Accordingly, the determination result in Step S208 may be "NO." In that case (Step S208; NO), the EUV light generation controller 5 may execute a one-shot control subroutine for oscillating a single pulse laser beam (Step S212). Thereafter, the EUV light generation controller 5 may determine whether a time length for which the burst output/rest request is in the burst output request state (burst output request time length) is being measured (Step S213). In the idling operation stage, the EUV light generation controller 5 has not started measuring the burst output request time length. Accordingly, the determination result in Step S213 may be "NO." In that case (Step S213; NO), the EUV light generation controller 5 may determine whether a time length for which the gate signal S6 is turned ON (gate open time) has elapsed (Step S214). In the idling operation stage, the gate open time has not been set. Accordingly, the determination result in Step S214 may be "NO." In that case (Step S214; NO), the EUV light generation controller 5 may return to Step S202 and execute the subsequent steps. The flow in Steps S202 through S214 as described above may be the idling operation until the burst output request is inputted.

When there is a change in the burst output/rest request so as to be turned into the burst output request state, the following operation may be executed. For example, when a voltage signal of the burst output/rest request has been changed from a LOW state, which is the burst rest request state, into a HIGH state, which is the burst output request state, this change in the state may be detected and the determination result in Step S202 may be set to YES (Step S202; YES). Then, the EUV light generation controller 5 may start measuring the burst output request time length (Step S203). A timer counter (not shown) or the like may be used, for example, to measure the burst output request time length. Subsequently, the EUV light generation controller 5 may set the gate open timing (T61), at which the gate signal S6 is turned ON (Step S204). This gate open timing may be calculated, for example, based on the rise timing T51 of the burst output/rest request, the delay time R6, and the output duration of the shutter switching signal S4. The delay time R6 may be in any length greater than a time length required so that the rise timing T61 of the gate signal S6 resides outside the output duration of the shutter switching signals S4. The delay time R6 may be preset to the EUV light generation controller 5 or to the controller 110. Subsequently, the EUV light generation controller 5 may execute the one-shot control subroutine (Step S212). Then, the EUV light generation controller 5 may determine whether the burst output request time length is being measured (Step S213). After the burst output/rest request is set to the burst output request state, the EUV light generation controller 5 has started measuring the burst output request time length. Accordingly, the determination result in Step S213 may be "YES." In that case (Step S213; YES), the EUV light generation controller 5 may return to Step S202 and execute the subsequent steps. The flow in Steps S202 through S213 as described above may be the operation after the burst output/rest request is set to the burst output request state.

From the time when the burst output/rest request is set to the burst output request state until the burst output/rest request is set to the burst rest request state, the following operation may be executed. Here, a case where the gate open timing has been reached before the burst output/rest request is set to the burst rest request state will be illustrated; however, the gate open timing may be reached after the burst output/rest request is set to the burst rest request state. In the operation to be described below, the burst output/rest request has already been set to the burst output request state. Since there is no change in the state of the burst output/rest request, the determination result in Step S202 may be "NO." In that case (Step S202; NO), the EUV light generation controller 5 may determine whether there has been a change in the burst output/rest request so as to be turned into the burst rest request state (Step S205). When there is no change to be turned into the burst rest request state, the determination result in Step S205 may be "NO." In that case (Step S205; NO), the EUV light generation controller 5 may determine whether the gate open timing (T61) has been reached (Step S208). When the gate open timing has not been reached (Step S208; NO), the EUV light generation controller 5 may move to Step S212 and execute the subsequent steps. Meanwhile, when the gate open timing has been reached (Step S208; YES), the EUV light generation controller 5 may start outputting the gate signal S6, that is, turning the gate signal S6 ON (Step S209). Then, the EUV light generation controller 5 may start measuring the gate open time (Step S210). A timer counter (not shown) or the like may be used, for example, to measure the gate open time. Then, the EUV light generation controller 5 may reset the gate open timing that has been set previously (Step S211). Thereafter, the EUV light generation controller 5 may move to Step S212 and execute the subsequent steps.

In the operation from Step S212 and on, the EUV light generation controller 5 may first execute the one-shot control subroutine (Step S212). Then, the EUV light generation controller 5 may determine whether the burst output request time length is being measured (Step S213). Here, the EUV light generation controller 5 is measuring the burst output request time length, when the burst output/rest request has not been set to the burst rest request state after it has been once set to the burst output request state. Accordingly, the determination result in Step S213 may be "YES." In that case (Step S213; YES), the EUV light generation controller 5 may return to Step S202 and execute the subsequent steps. The flow in Steps S202 through S213 as described above may be the operation after the burst output/rest request is set to the burst output request state until it is set to the burst rest request state.

When the burst rest request is inputted, the following operation may be executed. In the operation to be described below, it is assumed that the burst output/rest request has already been set to the burst output request state. Since there is no change in the burst output/rest request, the determination result in Step S202 may be "NO." In that case (Step S202; NO), the EUV light generation controller 5 may determine whether there has been a change in the burst output/rest request so as to be turned into the burst rest request state (Step S205). When there has been a change to be turned into the burst rest request state, for example, if the voltage signal of the burst output/rest request has been changed from the HIGH state to the LOW state, this change in the state may be detected, and the determination result in Step S205 may be set to "YES" (Step S205; YES). Then, the EUV light generation controller 5 may stop measuring the burst output request time length (Step S206). Subsequently, the EUV light generation controller 5 may set the measured burst output request time length as the gate open time (Step S207). Then, the EUV light generation controller 5 may determine whether the gate open timing (T61) has been reached (Step S208). Here, the gate open timing is reset after the gate open timing has already been reached, and the EUV light generation controller 5 may wait for the burst output/rest request to be turned into the burst output request state. Accordingly, the determination result in Step S208 may be "NO." In that case (Step S208; NO), the EUV light generation controller 5 may move to Step S212 and execute the one-shot control subroutine (Step S212). Then, the EUV light generation controller 5 may determine whether the burst output request time length is being measured (Steps S213). When the burst output/rest request is set to the burst rest request state, the EUV light generation controller 5 has stopped measuring the burst output request time length. Accordingly, the determination result in Step S213 may be "NO." In that case (Step S213; NO), the EUV light generation controller 5 may determine whether the gate open time has elapsed (Step S214). When the gate open time has not elapsed (Step S214; NO), the EUV light generation controller 5 may return to Step S202 and execute the subsequent steps. Meanwhile, when the gate open time has elapsed (Step S214; YES), the EUV light generation controller 5 may stop outputting the gate signal S6, that is, turning the gate signal S6 OFF (Step S215). Then, the EUV light generation controller 5 may stop measuring the gate open time (Step S216). Thereafter, the EUV light generation controller 5 may determine whether generation of the EUV light 252 is to be stopped (Steps S217). When the generation of the EUV light 252 is not to be stopped (Step S217; NO), the EUV light generation controller 5 may return to Step S202 and execute the idling operation. Meanwhile, when the generation of the EUV light 252 is to be stopped (Step S217; YES), the EUV light generation controller 5 may terminate this operation.

Figure 36:
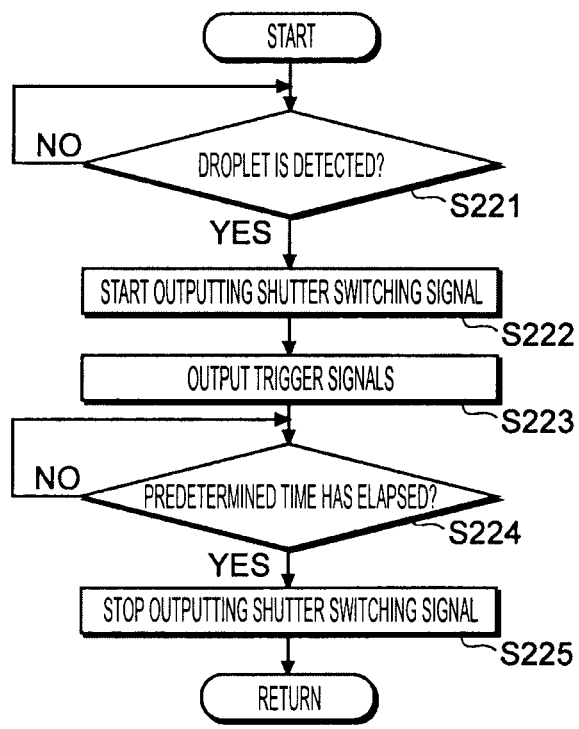
FIG. 36 is a flowchart showing an example of a one-shot control subroutine shown in FIG. 35.

FIG. 36 is a flowchart showing an example of the one-shot control subroutine shown in Step S212 of FIG. 35. As illustrated in FIG. 36, in the one-shot control subroutine, the EUV light generation controller 5 may first wait until the droplet detection signal S2 is inputted from the target sensor 4 (Step S221; NO). When the droplet detection signal S2 is received (Step S221; YES), the EUV light generation controller 5 may control the controller 110 to start outputting the shutter switching signals S4 to the respective optical shutters $20_1$ through $20_n$ (Step S222). That is, the shutter switching signals S4 may be turned ON. The shutter switching signals S4 may pass through the delay circuits $40_1$ through $40_n$ provided respectively to the optical shutters $20_1$ through $20_n$, to thereby be delayed by a predetermined time for the respective optical shutters $20_1$ through $20_n$. Further, the EUV light generation controller 5 may control the controller 110 to start outputting the trigger signals S3 to the master oscillator 11 (Step S223). The trigger signals S3 may pass through the delay circuit $40_m$, to thereby be delayed by a predetermined time.

Subsequently, the EUV light generation controller 5 may wait until a time in which the shutter switching signal S4 is ON for each pulse (predetermined time) elapses (Step S224, NO). This predetermined time may be preset or inputted from an external apparatus. When the predetermined time has elapsed (Step S224; YES), the EUV light generation controller 5 may control the controller 110 to stop outputting the shutter switching signals S4 (Step S225). That is, the shutter switching signal S4 may be turned OFF. Subsequently, the EUV light generation controller 5 may return to Step S212 of FIG. 35.

10.2.3 Effect

According to the above operation, the master oscillator 11 may be controlled to oscillate at a predetermined repetition rate in synchronization with the timing of the droplets 27. Further, the optical shutters 20 may be switched in synchronization with the timing of the droplets 27. With this, the pulsed laser beam 33 and the droplets 27 may be synchronized in the plasma generation region 25 with higher precision. Other effects may be similar to those of the above-described embodiments.

10.3 Modifications of Operation

The EUV light generation operation according to the seventh embodiment may be modified as follows.

10.3.1 Timing Chart

Figure 37:
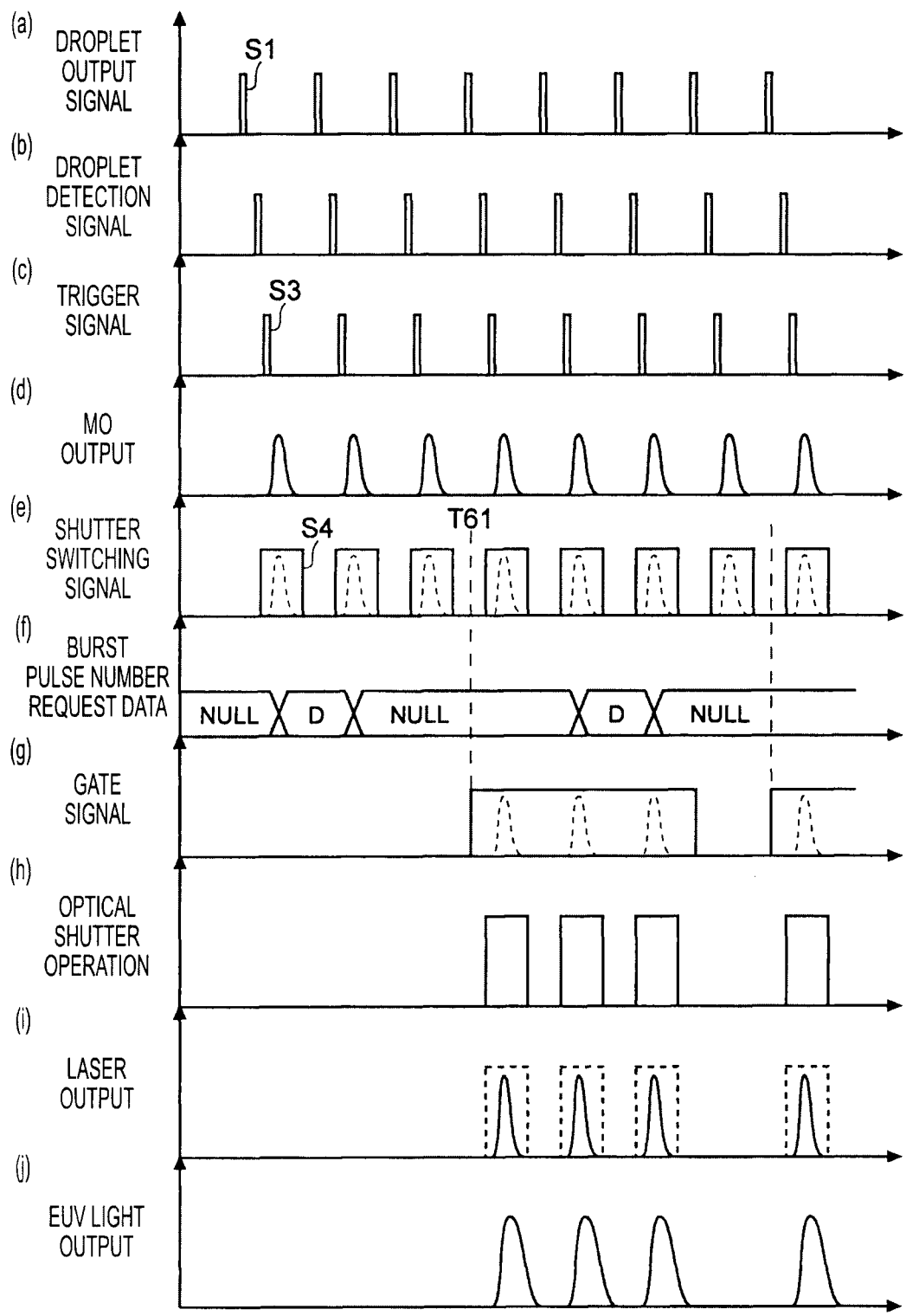
FIG. 37 is a timing chart showing an example of various signals according to a modification of the seventh embodiment.

FIG. 37 is a timing chart showing various signals according to a modification of the seventh embodiment. As may be apparent when FIG. 37 is compared to FIG. 34, in place of the burst output/rest request, a burst pulse number request data may be inputted to the EUV light generation controller 5 in this modification. The burst pulse number request data may designate the number of pulses requested per burst output. The burst pulse number request data may be inputted to the EUV light generation controller 5 through a data line such as a bus line. That is, the EUV light generation controller 5 may be connected to an external apparatus, such as the exposure apparatus controller 61, via the bus line.

10.3.2 Flowchart

Figure 38:
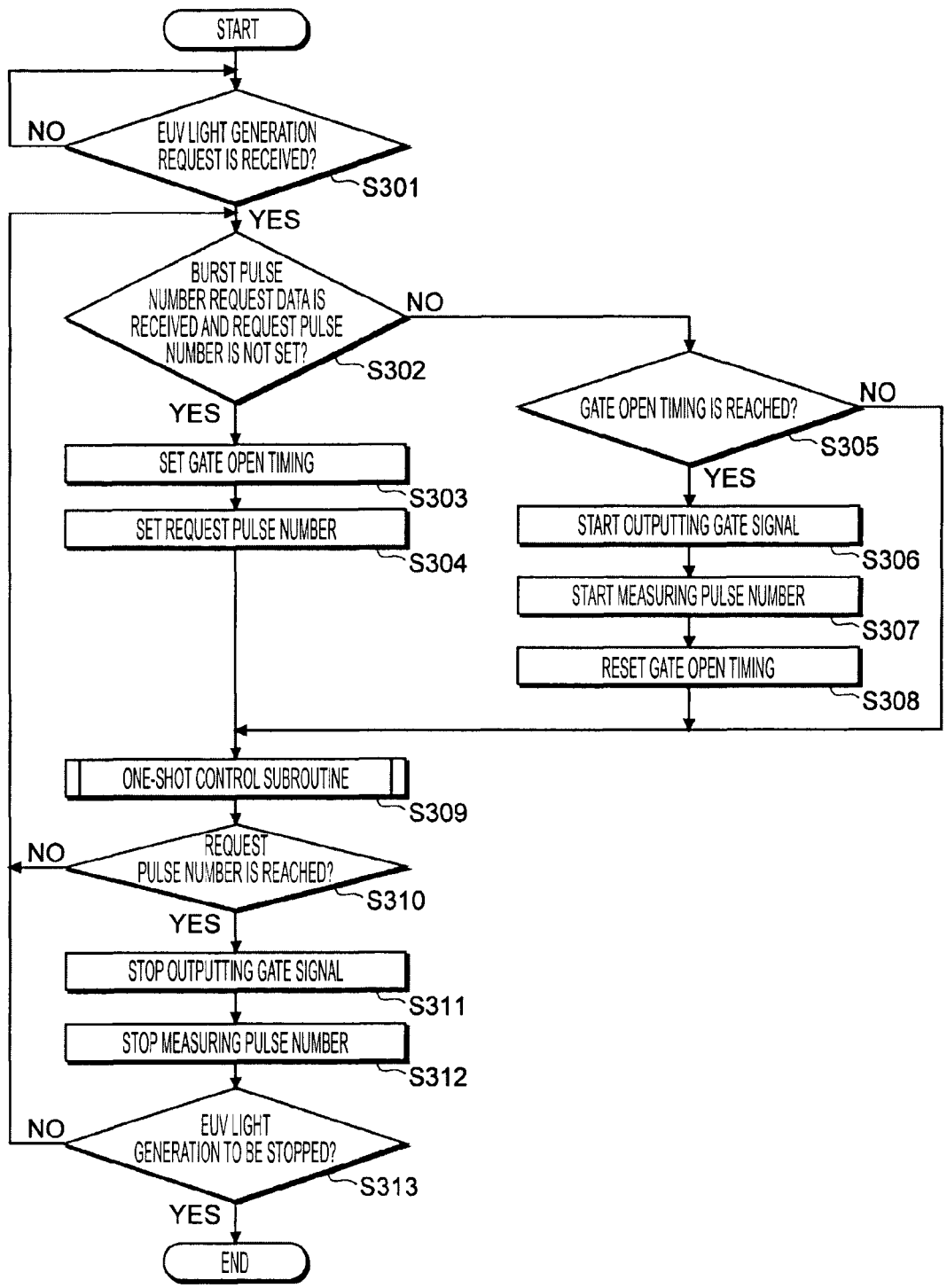
FIG. 38 is a flowchart showing an example of the operation for generating EUV light according to the modification of the seventh embodiment.

FIG. 38 is a flowchart showing the EUV light generation operation according to the modification of the seventh embodiment. Here, the description will be given with a focus on the EUV light generation controller 5 for integrally controlling various controllers. As illustrated in FIG. 38, the EUV light generation controller 5 may wait for the EUV light generation request to be inputted from an external apparatus, such as the exposure apparatus controller 61 (Step S301; NO). When the EUV light generation request is inputted (Step S301; YES), the EUV light generation controller 5 may execute the following operation as an idling operation until the burst pulse number request data is received. That is, the EUV light generation controller 5 may determine whether the burst pulse number request data has been received (Step S302). At this stage, the EUV light generation controller 5 has not received the burst pulse number request data. Accordingly, the determination result in Step S302 may be "NO." In that case (Step S302; NO), the EUV light generation controller 5 may then determine whether the gate open timing (T61), at which the gate signal S6 is to be turned ON, has been reached (Step S305). At this stage, the gate open timing has not been set. Accordingly, the determination result in Step S305 may be "NO." In that case (Step S305; NO), the EUV light generation controller 5 may execute the one-shot control subroutine (Step S309). The one-shot control subroutine may be similar to that shown in FIG. 36. Thereafter, the EUV light generation controller 5 may determine whether the number of pulses requested in the burst pulse number request data has been reached (Step S310). At this stage, the pulses have not been counted. Accordingly, the determination result in Step S310 may be "NO." In that case (Step S310; NO), the EUV light generation controller 5 may return to Step S302 and execute the subsequent steps. The flow in Steps S302 through S310 as described above may be the idling operation until the burst pulse number request data is received.

When the burst pulse number request data is received, the following operation may be executed. That is, when the burst pulse number request data is received and the requested pulse number is not set (Step S302; YES), the EUV light generation controller 5 may set the gate open timing (T61) (Step S303). The gate open timing may be calculated, for example, from the input timing of the burst pulse number request data (this may correspond to the timing T51 in FIG. 34, for example), the delay time R6, and the output duration of the shutter switching signal S4. Thereafter, the EUV light generation controller may set the requested pulse number contained in the burst pulse number request data to a counter (not shown) or the like (Step S304). Subsequently, the EUV light generation controller 5 may execute the one-shot control subroutine (Step S309). Then, the EUV light generation controller 5 may determine whether the requested pulse number has been reached (Step S310). At this stage, the pulses have not been counted. Accordingly, the determination result in Step S310 may be "NO." In that case (Step S310; NO), the EUV light generation controller 5 may return to Step S302 and execute the subsequent steps. The flow in Steps S302 through S310 as described above may be the operation when the burst pulse number request data has been received.

When the burst pulse number request data is received and the requested pulse number is set, the following operation may be executed. In the operation to be described below, the requested pulse number is already set. Accordingly, the determination result in Step S302 may be "NO." In that case (Step S302; NO), the EUV light generation controller may determine whether the gate open timing (T61) has been reached (Step S305). When the gate open timing has not been reached (Step S305; NO), the EUV light generation controller 5 may move to Step S309 and execute the subsequent steps. Meanwhile, when the gate open timing has been reached (Step S305; YES), the EUV light generation controller 5 may start outputting the gate signal S6, that is, turning the gate signal S6 ON (Step S306). Then, the EUV light generation controller 5 may start measuring the pulse number after the gate signal S6 is turned ON (Step S307). A timer counter (not shown) or the like may be used, for example, to measure the pulse number. Further, counting of the pulse number may be carried out by counting the trigger signals S3, the shutter switching signals S4, signals by detecting the actually outputted pulsed laser beam 31 with a laser sensor (not shown), signals by detecting the outputted EUV light with an EUV sensor (not shown), or the like. Then, the EUV light generation controller 5 may reset the gate open timing that has been set previously (Step S308). Thereafter, the EUV light generation controller 5 may move to Step S309 and execute the subsequent steps.

In the operation from Step S309 and on, the EUV light generation controller 5 may first execute the one-shot control subroutine (Step S309). Then, the EUV light generation controller 5 may determine whether the requested pulse number has been reached (Step S310). When the requested pulse number has not been reached (Step S310; NO), the EUV light generation controller 5 may return to Step S302 and execute the subsequent steps. Meanwhile, when the requested pulse number has been reached (Step S310; YES), the EUV light generation controller 5 may stop outputting the gate signal S6, that is, turning the gate signal S6 OFF (Step S311). Then, the EUV light generation controller 5 may stop measuring the pulse number (Step S312). At this time, the counter used to measure the pulse number may be reset. Subsequently, the EUV light generation controller 5 may determine whether generation of the EUV light 252 is to be stopped (Step S313). When the generation of the EUV light 252 is not to be stopped (Step S313; NO), the EUV light generation controller 5 may return to Step S302 and execute the idling operation. Meanwhile, when the generation of the EUV light 252 is to be stopped (Step S313; YES), the EUV light generation controller 5 may terminate this operation.

10.3.3 Effect

According to the above operation, a time for which the gate signal S6 is being turned ON (gate open time) does not have to be measured; thus, the operation may be simplified. This in turn may facilitate faster operation. Other effects may be similar to those of the above-described embodiments.

11. Variations of Optical Shutter (Modifications) Modifications

Variations of the optical shutter according to the above embodiments will be illustrated below. Each optical shutter discussed below can be used subsequent to the master oscillator 11 or the amplifier 30 as shown in, for example, FIG. 3. When each optical shutter is used as the optical shutter $20_1$, input and output pulse laser beams are indicated as L1 (see, e.g., FIG. 3). When each optical shutter is used as one of the optical shutter $20_2$-$20_n$, input and output pulse laser beams are indicted as L2 (see, e.g., FIG. 3).

11.1 First Modification

Figure 39:
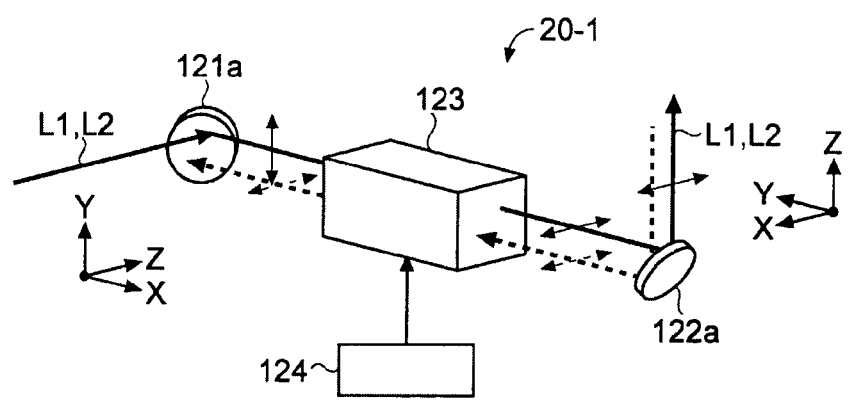
FIG. 39 schematically illustrates the configuration of an optical shutter according to a first modification.

FIG. 39 schematically illustrates the configuration of an optical shutter according to a first modification. In an optical shutter 20-1, reflective polarizers (hereinafter, simply referred to as mirrors) 121a and 122a may be used, in place of the transmissive polarizers 121 and 122, for example. Polarizers such as Absorbing Thin Film Reflectors (ATFR) may be used as the mirrors 121a and 122a, respectively. The ATFR may reflect the S-polarization component of a laser beam incident thereon with high reflectivity (99% or higher), and may absorb most of the P-polarization component (may reflect the P-polarization component with the reflectivity of 1% or less). Even with such configuration, a similar function to that of the optical shutter 20 shown in FIG. 13 may be achieved. That is, the mirrors 121a and 122a may reflect the S-polarization component of the pulse laser beam L1 and L2 incident thereon with high reflectivity. The mirrors 121a and 122a may be disposed such that their planes of incidence of the pulse laser beams L1 and L2 form an angle of 90 degrees. In that case, the S-polarization component of the pulse laser beams L1 and L2 reflected selectively by the mirror 121a may have its polarization direction rotated while the high voltage pulse is applied to the Pockels cell 123 by the high voltage power source 124. Accordingly, the pulse laser beams L1 and L2 may be reflected by the mirror 122a with high reflectivity. Meanwhile, while the high voltage pulse is not applied to the Pockels cell 123 by the high voltage power source 124, the pulse laser beams L1 and L2, having passed through the Pockels cell 123, may be absorbed by the mirror 122a.

11.2 Second Modification

Figure 40:
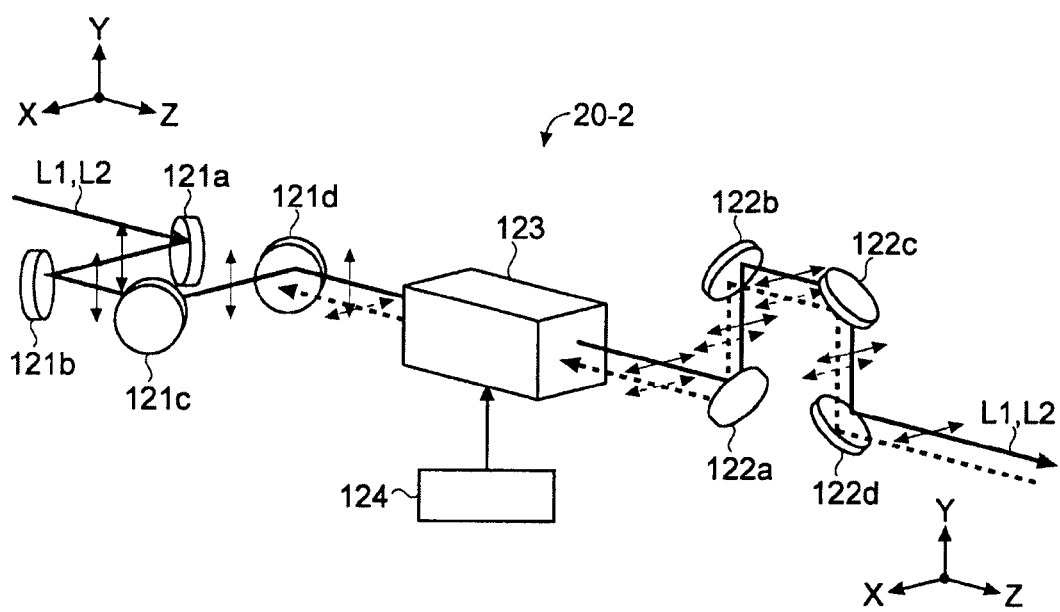
FIG. 40 schematically illustrates the configuration of an optical shutter according to a second modification.

FIG. 40 schematically illustrates the configuration of an optical shutter according to a second modification. As illustrated in FIG. 40, in an optical shutter 20-2, four mirrors 121a through 121d may be disposed at the input side of the Pockels cell 123. Further, in the optical shutter 20-2, four mirrors 122a through 122d may be disposed at the output side of the Pockels cell 123. Polarizers such as ATFRs may be used as the mirrors 121a through 121d and 122a through 122d, respectively. The mirrors 121a through 121d may be positioned such that their planes of incidence of the pulse laser beams L1 and L2 lie in substantially the same plane. A plane of incidence is a plane determined by a given ray, incident on a surface, and the normal at the point where the incident ray strikes the surface. Further, the mirrors 122a through 122d may be such that their planes of incidence of the pulse laser beams L1 and L2 lie in substantially the same plane. Here, the plane containing the planes of the incidence of the mirrors 121a through 121d may be perpendicular to the plane containing the planes of incidence of the mirrors 122a through 122d. In this way, when a plurality of mirrors is arranged so as to reflect the same polarization component and absorb the other polarization component at the input and output sides, respectively, the total absorptivity of the other polarization component may be increased, whereby the purity of the specific polarization component can be increased.

11.3 Third Modification

Figure 41:
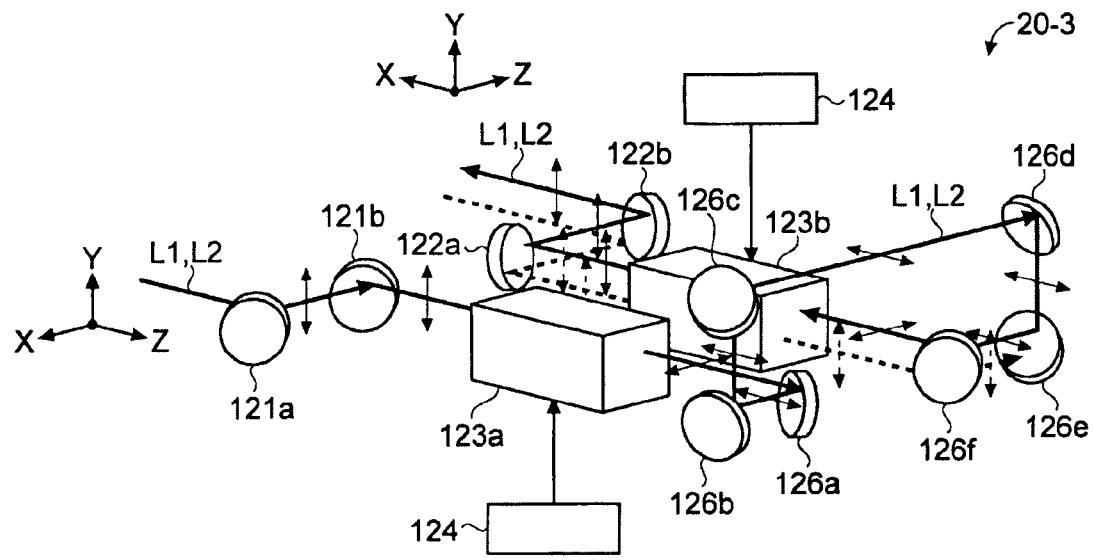
FIG. 41 schematically illustrates the configuration of an optical shutter according to a third modification.

FIG. 41 schematically illustrates the configuration of an optical shutter according to a third modification. As illustrated in FIG. 41, an optical shutter 20-3 may include two Pockels cells 123a and 123b. The Pockels cells 123a and 123b may be similar to the Pockels cell 123. The Pockels cell 123a may be disposed upstream from the Pockels cell 123b. The mirrors 121a and 121b may be disposed at the input side of the Pockels cell 123a. High-reflection mirrors 126a and 126f and mirrors 126b through 126e may be disposed between the Pockels cells 123a and 123b. The mirrors 122a and 122b may be disposed at the output side of the Pockels cell 123b. The mirrors 121a, 121b, 126b through 126e, 122a, and 122b may include polarizers, such as ATFRs. The mirrors 121a, 121b, 122a, and 122b may be positioned such that their planes of incidence of the pulse laser beams L1 and L2 lie in substantially the same plane. The mirrors 126b through 126e may be positioned such that their planes of incidence of the pulse laser beams L1 and L2 lie in substantially the same plane. Here, the plane containing the planes of the incidence of the mirrors 121a, 121b, 122a, and 122b may be perpendicular to the plane containing the planes of incidence of the mirrors 126b through 126e. In this way, when the plurality of the Pockels cells 123a and 123b is used, the total absorptivity of an unwanted polarization component may be increased, whereby the purity of the specific polarization component can be increased.

11.4 Fourth Modification

Figure 42:
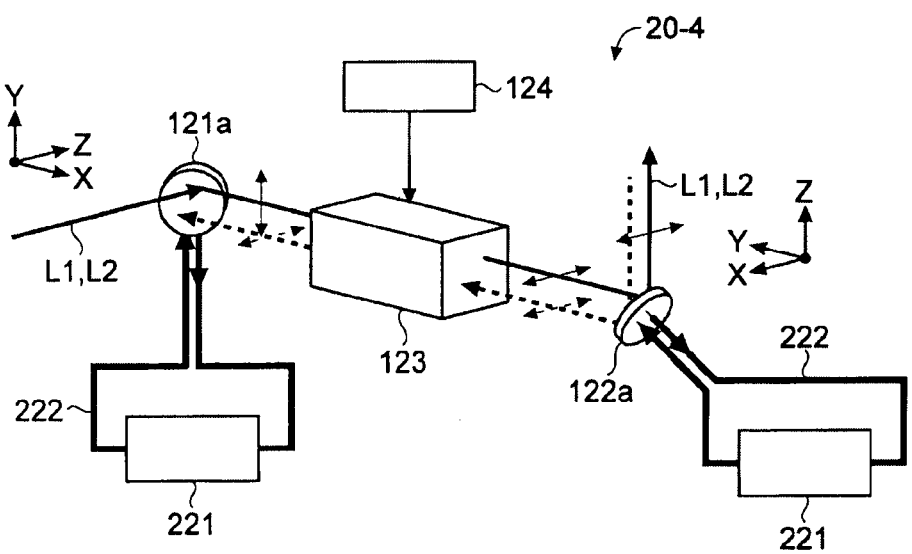
FIG. 42 schematically illustrates the configuration of an optical shutter according to a fourth modification.

FIG. 42 schematically illustrates the configuration of an optical shutter according to a fourth modification. As illustrated in FIG. 42, in an optical shutter 20-4, the mirrors 121a and 122a may respectively be provided with cooling devices 221, in a configuration similar to that of the optical shutter 20-1 shown in FIG. 39. A cooling medium supplied from the cooling devices 221 may flow through flow channels 222 and into internal flow channels of the respective mirrors 121a and 122a. The mirrors 121a and 122a may be provided with the internal flow channels respectively for making the cooling medium flow efficiently along the rear side of the reflective surface. Cooling the reflective surfaces of the mirrors 121a and 122a efficiently and in a balanced manner may make it possible to suppress thermal deformation of the mirror surfaces. As a result, the direction of the pulse laser beams L1 and L2 reflected by the optical shutter 20-4 and the wavefront of the reflected pulse laser beams L1 and L2 may be stabilized. A cooling device can also be provided to the Pockels cell 123 to suppress the overheating in the Pockels cell 123.

12. Supplementary Description 12.1 Regenerative Amplifier

Figure 43:
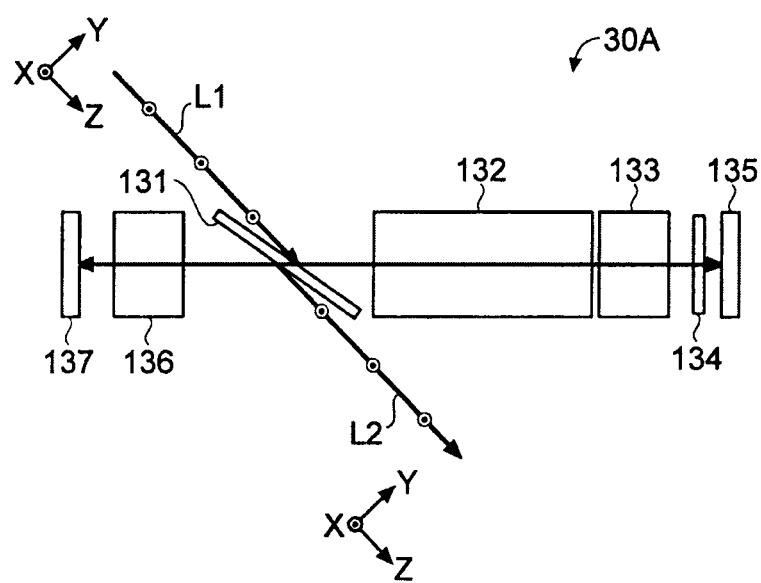
FIG. 43 illustrates an example of the configuration of a regenerative amplifier pertaining to this disclosure.

FIG. 43 illustrates an example of a regenerative amplifier 30A. The regenerative amplifier 30A may include a polarization beam splitter 131, a $CO_2$ gas amplification part 132, Pockels cells 133 and 136, a quarter-wave plate 134, and resonator mirrors 135 and 137.

The polarization beam splitter 131 may be configured of a thin-film polarizer, for example. The polarization beam splitter 131 may reflect the S-polarization component of the laser beam incident thereon and transmit the P-polarization component thereof. The S-polarization component of the pulse laser beam L1 entering the regenerative amplifier 30A may first be reflected by the polarization beam splitter 131. With this, the pulse laser beam L1 may be taken into the resonator including the resonator mirrors 135 and 137. The pulse laser beam L1 taken into the resonator may be amplified as it passes through the $CO_2$ gas amplification part 132. The pulse laser beam L1 may pass through the Pockels cell 133, to which the voltage is not applied, then be transmitted through the quarter-wave plate 134, be reflected by the resonator mirror 135, and again be transmitted through the quarter-wave plate 134. With this, the polarization direction of the pulse laser beam L1 may be rotated by 90 degrees.

The pulse laser beam L1 may then pass through the Pockels cell 133 again, to which the voltage is not applied. As this point, a predetermined voltage may be applied to the Pockels cell 133 after the pulse laser beam L1 passes therethrough. The Pockels cell 133, to which the voltage is applied, may give a phase shift of a quarter-wave to the laser beam passing therethrough. Accordingly, while the predetermined voltage is applied to the Pockels cell 133, the pulse laser beam L1 may be incident on the polarization beam splitter 131 as the P-polarization component. With this, the pulse laser beam L may be trapped in the resonator.

Thereafter, at timing at which the pulse laser beam L1 is to be outputted, the predetermined voltage may be applied to the Pockels cell 136. The pulse laser beam L1 reciprocating in the resonator may be transmitted through the polarization beam splitter 131 and then be subjected to the quarter-wave phase shift when passing through the Pockels cell 136. With this, the linearly polarized pulse laser beam L1 may be converted into a circularly polarized pulse laser beam L1. Thereafter, the pulse laser beam L1 may be reflected by the resonator mirror 137 and again pass through the Pockels cell 136. With this, the circularly polarized pulse laser beam L1 may be converted into the linearly polarized pulse laser beam L1. The pulse laser beam L1 incident as the S-polarization component may be reflected by the polarization beam splitter 131, and be outputted from the regenerative amplifier 30A as the pulse laser beam L2.

In the above operation, timing at which the voltage is applied to the Pockels cells 133 and 136 or the value of the applied voltage is not at the target timing or the target value, the polarization direction of the pulse laser beam L reciprocating in the resonator may not be controlled accurately and precisely. In that case, the returning beam reflected by the polarization beam splitter 131 and traveling toward the master oscillator 11 may be generated. Here, the optical shutter 20 may function as an optical isolator for blocking such returning beam. Further, even when the polarization beam splitter 131 has a wavelength dependency in which the polarization beam splitter 131 reflects part of the P-polarization component outside the predetermined wavelength range as the returning beam, the optical shutter 20 may function as an optical isolator for blocking such returning beam. That is, the optical shutter may function as an optical isolator for both the S-polarization component and the P-polarization component.

The above-described embodiments and the modifications thereof are merely examples for implementing this disclosure, and this disclosure is not limited thereto. Making various modifications according to the specifications or the like is within the scope of this disclosure, and it is apparent from the above description that other various embodiments are possible within the scope of this disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not being limited to the stated elements." The term "have" should be interpreted as "including the stated elements but not being limited to the stated elements." Further, the modifier "one (a/an)" should be interpreted as "at least one" or "one or more."

What is claimed is:
1. A laser apparatus, comprising:
   a master oscillator configured to output a pulsed laser beam continually at a repetition rate;
   a plurality of amplifiers disposed on a beam path of the pulsed laser beam;

a plurality of optical shutters disposed on the beam path of the pulsed laser beam; and a controller configured to switch the plurality of optical shutters, wherein each of the plurality of optical shutters includes:

an electro-optic device;

a first optical filter disposed at an input side of the electro-optic device;

a second optical filter disposed at an output side of the electro-optic device; and a power source coupled to the electro-optic device for applying voltage to the electro-optic device, and wherein the controller is configured to switch the plurality of optical shutters based on a signal inputted from an external apparatus while the master oscillator oscillates the pulsed laser beam, to perform a burst operation to repeatedly alternate a period for which the pulsed laser beam is outputted at the repetition rate and a period for which the pulsed laser beam is not outputted, and to control the plurality of optical shutters to open sequentially from an upstream side optical shutter to a downstream side optical shutter.

2. The laser apparatus according to claim 1, wherein at least one of the plurality of the amplifiers is a regenerative amplifier.

3. The laser apparatus according to claim 1, wherein the electro-optic device is a Pockels cell.

4. The laser apparatus according to claim 3, wherein the first and second optical filters each include at least one polarizer.

5. The laser apparatus according to claim 4, wherein at least one of the plurality of optical shutters includes a cooling device for cooling at least one of the electro-optic device and the at least one polarizer.

6. The laser apparatus according to claim 1, wherein the at least one of optical shutter includes:

a magneto-optic device;

a first optical filter disposed at an input side of the magneto-optic device;

a second optical filter disposed at an output side of the magneto-optic device; and a magnetic field generation source coupled to the magneto-optic device for generating a magnetic field inside the magneto-optic device.

7. The laser apparatus according to claim 6, wherein the magneto-optic device is a Faraday rotator.

8. The laser apparatus according to claim 7, wherein the first and second optical filters each include at least one polarizer.

9. The laser apparatus according to claim 8, wherein the optical shutter includes a cooling device for cooling at least one of the magneto-optic device and the at least one polarizer.

10. The laser apparatus according to claim 1, wherein the at least one optical shutter includes:

an acousto-optic device; and a signal generator coupled to the acousto-optic device for inputting a signal to the acousto-optic device.

11. The laser apparatus according to claim 1, wherein the master oscillator is configured to output the pulsed laser beam continually at the repetition rate, and the controller switches the at least one optical shutter while the master oscillator oscillates the pulsed laser beam, to cause the pulsed laser beam to be outputted in burst.

12. The laser apparatus according to claim 1, wherein the signal inputted from the external apparatus is a detection signal of a target material to be irradiated by the pulsed laser beam.

13. The laser apparatus according to claim 1, wherein:

the signal inputted from the external apparatus includes a burst output request and a burst rest request from an exposure apparatus; and the controller opens at least one of the plurality of optical shutters during a period from an input of the burst output request to an input of the burst rest request, and closes the at least one of the plurality of optical shutters during a period from the input of the burst rest request to an input of the subsequent burst output request.

14. The laser apparatus according to claim 1, wherein the plurality of optical shutters includes:

a first optical shutter disposed at an output side of the master oscillator; and a second optical shutter disposed at an output side of at least one of the plurality of amplifiers, wherein the controller opens the first optical shutter before the pulsed laser beam outputted from the master oscillator passes through the first optical shutter and closes the first optical shutter after the pulsed laser beam passes through the first optical shutter on a pulse to pulse basis, opens the second optical shutter during a burst output period for which the pulsed laser beam is outputted in burst, and closes the second optical shutter during a burst rest period for which the pulsed laser beam is not outputted in burst.

* * * * *